(12) United States Patent
Nakamura

(10) Patent No.: US 11,566,799 B2
(45) Date of Patent: Jan. 31, 2023

(54) STRUCTURAL BODY

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 201 days.

(21) Appl. No.: 17/098,333

(22) Filed: Nov. 14, 2020

(65) Prior Publication Data
US 2021/0063034 A1 Mar. 4, 2021

Related U.S. Application Data

(63) Continuation of application No. PCT/JP2019/019935, filed on May 20, 2019.

(30) Foreign Application Priority Data

Jun. 21, 2018 (JP) .............................. JP2018-117530

(51) Int. Cl.
*F24F 5/00* (2006.01)
*E06B 3/67* (2006.01)
*F28D 20/02* (2006.01)

(52) U.S. Cl.
CPC .......... *F24F 5/0075* (2013.01); *E06B 3/6715* (2013.01); *F28D 20/02* (2013.01); *F24F 2005/0078* (2013.01)

(58) Field of Classification Search
CPC ............. F24F 5/0075; F24F 2005/0078; F24F 5/0021; E06B 3/6715; E06B 3/67;
(Continued)

(56) References Cited

U.S. PATENT DOCUMENTS 4,235,048 A 11/1980 Gillery
4,664,816 A 5/1987 Walker
(Continued)

FOREIGN PATENT DOCUMENTS

CN 1376250 A 10/2002
CN 101952667 A 1/2011
(Continued)

OTHER PUBLICATIONS

List of Related Pending U.S. Patent Applications citing U.S. Appl. No. 16/912,024 to Takuju Nakamura, filed Jun. 25, 2020.

*Primary Examiner* — Steve S Tanenbaum
(74) *Attorney, Agent, or Firm* — Kenealy Vaidya LLP

(57) ABSTRACT

A structural body includes a refrigerant between a first plate and a second plate. A circulation structural part between the first and second plates includes a reservoir portion provided on a first plate side. In the circulation structural part, the refrigerant from the reservoir portion which has evaporated due to heat of the first plate side reaches a second plate side, condenses on the second plate side and is returned to the reservoir portion again. A temperature sensitive mechanism is in a first state when a temperature of the first plate side is equal to or higher than a predetermined temperature to allow refrigerant circulation, and is in a second state different from the first state when the temperature is lower than the predetermined temperature to prohibit the refrigerant circulation.

16 Claims, 11 Drawing Sheets

(58) Field of Classification Search
CPC ...... F28D 20/02; F28D 20/028; F28D 20/023; Y02A 30/00; Y02B 30/90; F28F 27/02; Y02E 60/14; E04B 1/76
USPC .......................................................... 165/54
See application file for complete search history.

(56) References Cited

U.S. PATENT DOCUMENTS

| | | |
|---|---|---|
| 6,860,322 B1 | 3/2005 | Rylewski |
| 2007/0240771 A1* | 10/2007 | Peric ........................ F16K 15/16 137/527 |
| 2011/0198052 A1 | 8/2011 | Bourne |
| 2014/0290285 A1 | 10/2014 | Formato et al. |
| 2020/0002588 A1 | 1/2020 | Nakamura et al. |

FOREIGN PATENT DOCUMENTS

| | | | | |
|---|---|---|---|---|
| FR | 2578312 A | * | 9/1986 | ............ F24J 2/0444 |
| JP | S56-107177 U | | 8/1981 | |
| JP | S57-193139 U | | 12/1982 | |
| JP | S58-62783 U | | 4/1983 | |
| JP | S60-42592 A | | 3/1985 | |
| JP | S62-7975 Y2 | | 2/1987 | |
| JP | S63-34819 U | | 3/1988 | |
| JP | H6-129787 A | | 5/1994 | |
| JP | H7-180267 A | | 7/1995 | |
| JP | 2002-350026 A | | 12/2002 | |
| JP | 2006-336233 A | | 12/2006 | |
| JP | 2007-271121 A | | 10/2007 | |
| JP | 6279778 B1 | | 2/2018 | |

* cited by examiner

FIG. 10
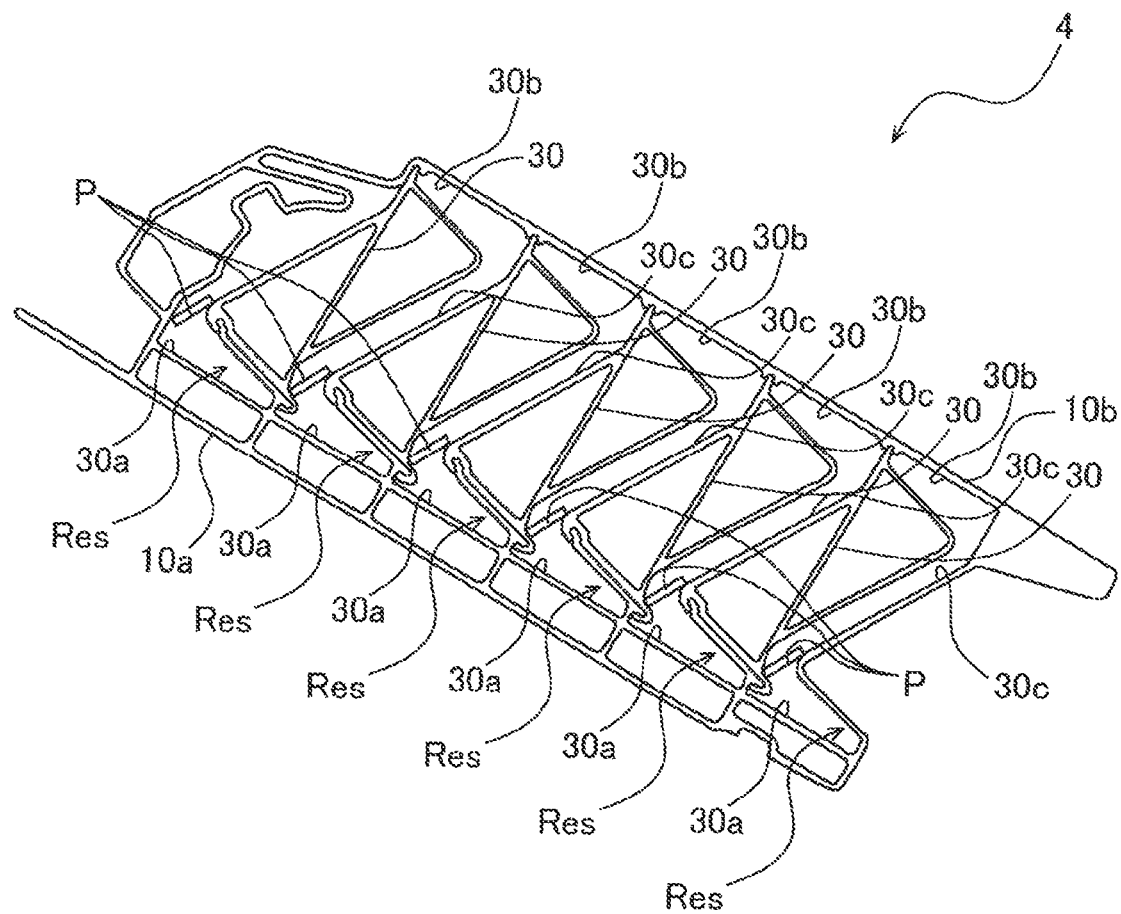
FIG. 11A
FIG. 11B
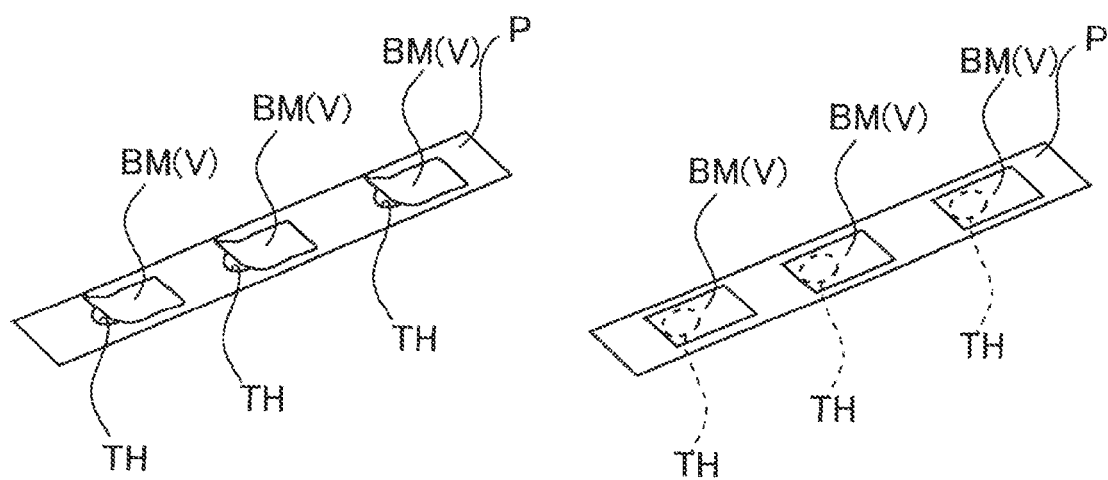

STRUCTURAL BODY

CROSS-REFERENCE TO RELATED APPLICATIONS

This application is a continuation of PCT International Patent Application No. PCT/JP2019/019935 filed on May 20, 2019, which claims the benefit of priority of Japanese Patent Application No. 2018-117530 filed on Jun. 21, 2018, the enter contents of which are incorporated herein by reference.

FIELD

One or more embodiments of the present invention relate to a structural body.

BACKGROUND

In the related art, there has been proposed a window including, between depressurized double glass, a working liquid and a working liquid heating unit/cooling unit that heats or cools the working liquid (see JP-A-2006-336233). According to this window, high heat insulating performance can be exhibited since pressure between the double glass is reduced, and a room interior can be made comfortable by healing or cooling the working liquid between the double glass without allowing moisture to flow in and out.

SUMMARY

However, according to the window disclosed in JP-A-2006-336233, since the working liquid needs to be heated or cooled, electric energy is required, and it is no different from operating an indoor air conditioner. Therefore, there is a demand for vacuum pair glass or the like that does not require electric energy and can use heat of outdoor atmosphere without allowing moisture to flow in and out.

In order to solve such a problem, the present inventor has proposed in Japanese Patent Application No. 2017-248814 (to which U.S. patent application Ser. No. 16/912,024 claims priority) a structural body that does not require electric energy and that can use heat of outdoor atmosphere without allowing moisture to flow in and out. Specifically, the structural body includes two plates, a refrigerant, and a slope. The two plates define a space therebetween, and the refrigerant is enclosed between the two plates. The slope defines a circulation structure in which a reservoir portion for the refrigerant is formed on one plate side of the two plates, and the refrigerant from the reservoir portion which has evaporated due to heat of the one plate side reaches the other plate side, condenses on the other plate side and is returned to the reservoir portion again.

According to such a structural body, in an environment where the refrigerant evaporates due to heat from one plate side, the one plate side is deprived of evaporation heat and is cooled. On the other hand, the evaporated refrigerant is cooled down when reaching the other plate side, and is condensed and liquefied, and condensation heat is dissipated from the other plate side. As a result, the heat of the one plate side is transmitted to the other plate side. Accordingly, for example, in summer, by setting the one plate as an indoor side, it is possible to make the room interior comfortable without taking in moisture. Moreover, since the condensed and liquefied refrigerant returns to the reservoir portion because of the slope, the above-described heat transmission can be continuously performed without requiring electric energy.

However, in such a structural body, as disclosed in the Description of Japanese Patent Application No. 2017-248814, a heat transmission direction is from one plate side to the other plate side. Therefore, for the structural body that is mounted in an orientation that heat in the room is transmitted to the outside in summer, heat from the air conditioner or the like escapes to the outside in summer as long as the front and back of the structural body itself are not reversed. Therefore, a structure is desired in which the structural body is in a non-operating state in winter so that heat in the room cannot escape to the outside in a case where the front and back thereof cannot be reversed.

One or more embodiments of the present invention have been made in view of the above-described circumstances, and an object thereof is to provide a structural body that allows heat in a room to transmit to the outside in summer, and enters a non-operating state in winter to make it difficult for heat to escape to the outside.

The structural body according to one or more embodiments of the present invention includes: a first plate and a second plate; a refrigerant enclosed between the first plate and the second plate; and a circulation structural part provided in a space between the first plate and the second plate and including a reservoir portion for the refrigerant is provided on the first plate side, the circulation structural part in which the refrigerant from the reservoir portion which has evaporated due to heat of the first plate side reaches the second plate side, condenses on the second plate side and is returned to the reservoir portion again. The structural body further includes a temperature-sensitive mechanism. When a temperature of the first plate side is equal to or higher than a predetermined temperature, the temperature-sensitive mechanism is in a first state to allow refrigerant circulation. When the temperature of the first plate side is lower than a specific temperature, the temperature-sensitive mechanism is in a second state to prohibit the refrigerant circulation.

According to one or more embodiments of the present invention, there is provided temperature-sensitive mechanism that is in a first state to allow refrigerant circulation when a temperature of the first plate side is equal to or higher than a predetermined temperature, and is in a second state to prohibit the refrigerant circulation when the temperature of the first plate side is lower than a specific temperature that is equal to or lower than the predetermined temperature. For this reason, when the room temperature is high as in summer, for example, the temperature-sensitive mechanism is in the first state and heat of the room interior can transmit to the outside. On the other hand, in winter, as long as the room temperature is not equal to or higher than the predetermined temperature, the temperature-sensitive mechanism can be in the second state, and the refrigerant circulation can be prohibited to establish a non-operating state. Accordingly, it is possible to cause the heat of the room interior to transmit to the outside in summer, and to enter the non-operating state in winter to make it difficult for the heat to escape to the outside.

BRIEF DESCRIPTION OF DRAWINGS

FIGS. 3A and 3B illustrate a partially enlarged view of the configuration illustrated in FIG. 2, in which FIG. 3A illustrates a first state, and FIG. 3B illustrates a second state.

FIGS. 6A and 6B illustrate an enlarged view of a partial configuration of an outer wall member according to a third embodiment, in which FIG. 6A illustrates a first state, and FIG. 6B illustrates a second state.

FIGS. 9A and 9B illustrate an enlarged view of a partial configuration illustrated in FIG. 7, in which FIG. 9A illustrates a first state, and FIG. 9B illustrates a second state.

FIG. 10 is a cross-sectional view of a roofing member according to a fifth embodiment.

FIGS. 11A and 11B illustrate is a perspective view of a part of the configuration illustrated in FIG. 10, in which FIG. 11A illustrates a first state, and FIG. 11B illustrates a second state.

DETAILED DESCRIPTION

Hereinafter, embodiments of the present invention will be described. The present invention is not limited to the embodiments to be described below, and can be changed as appropriate without departing from the spirit of the present invention. In the embodiments described below, some configurations are not illustrated or described, but it goes without saying that a known or well-known technique is applied as appropriate to details of an omitted technique within a range in which no contradiction occurs to contents described below.

Figure 1:
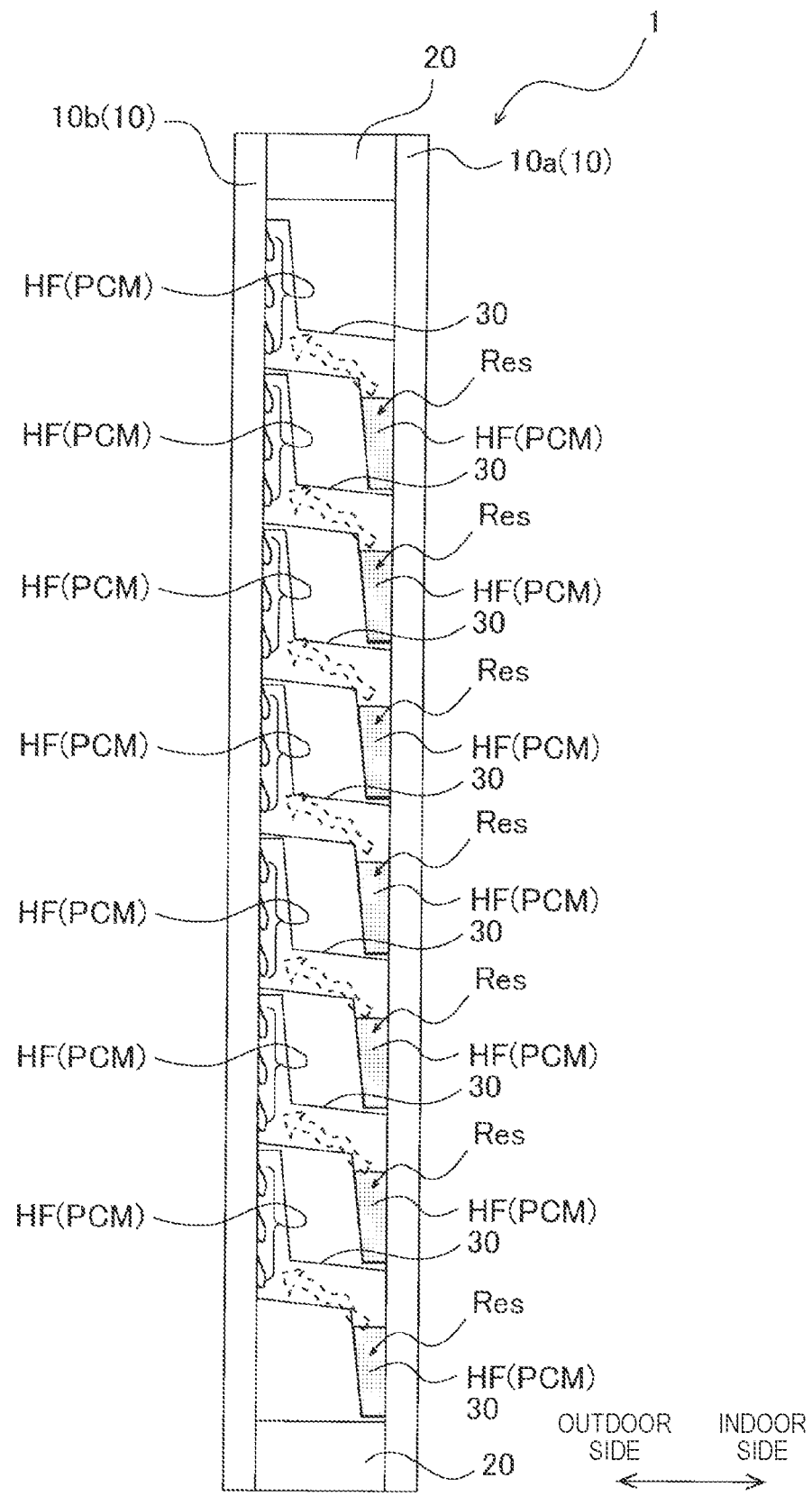
FIG. 1 is a cross-sectional view of a structural body according to a first embodiment of the present invention.

FIG. 1 is a cross-sectional view of a structural body according to a first embodiment of the present invention. Although an outer wall member that can be used as an outer wall of a building is described as an example of a structural body in FIG. 1, the structural body is not limited to an outer wall member, and may be applied as other members such as a window body, or may be used as, for example, a wall member of a box body having an interior thereof as a cool and dark place. Further, it may be used for an inclined surface or a horizontal surface, such as a roof or a floor surface.

An outer wall member 1 according to the example illustrated in FIG. 1 roughly includes two plates (a first plate and a second plate) 10, a sealing member 20, a slope (circulation structural part) 30, and a refrigerant (temperature-sensitive means (mechanism), latent heat storage material) HF.

The two plates 10 are plates arranged substantially parallel to each other. The sealing member 20 is interposed between the two plates 10 at peripheral end portions of the two plates 10. By providing the sealing member 20 at the peripheral end portions of the two plates 10, an internal space closed by the two plates 10 and the sealing member 20 is formed. In the present embodiment, the internal space is in a low pressure state from the viewpoint of heat insulating performance.

The slope 30 is a member that is interposed between the two plates 10, and is bent at about 90 degrees twice to form a bent body having a substantially N shape as illustrated in the cross-sectional view of FIG. 1. Of the substantially N-shaped slope 30, one end side thereof is in contact with one plate (first plate) 10a, and the other end side thereof is in contact with the other plate (second plate) 10b. An intermediate side of the substantially N-shaped slope 30 is an inclined structure in which one end on the plate 10a side is slightly lower. Such a slope 30 has a hollow interior, and one end part thereof constitutes the reservoir portion Res that can reserve the refrigerant HF.

Here, in the present embodiment, the refrigerant HF is constituted by a latent heat storage material PCM. The latent heat storage material PCM enters a first state of being dissolved when a temperature of one plate 10a, side is equal to or higher than a predetermined temperature, and enters a second state of being solidified when the temperature of the plate 10a side is lower than a specific temperature below the predetermined temperature. With respect to such a latent heat storage material PCM, refrigerant circulation is allowed in the first state of being dissolved, and refrigerant circulation is prohibited in the second state of being solidified. The details will be described below.

First, the latent heat storage material PCM used as the refrigerant HF is constituted by, for example, an inorganic salt hydrate, and has a melting point (a predetermined temperature) and a freezing point (a specific temperature, that is, a temperature lower than the melting point) of about 26 degrees. Such a latent heat storage material PCM behaves as salt water when an anhydrous inorganic salt is dissolved in water at a temperature equal to or higher than the melting point, and is solidified when water is taken into crystal as hydrated water at a temperature below the freezing point. The latent heat storage material PCM in a dissolved state is reserved in the reservoir portion Res.

The hydrated water, which is part of the latent heat storage material PCM in the dissolved state reserved in the reservoir portion Res, evaporates due to heat from the one plate 10a until a saturation water vapor pressure corresponding to a temperature thereof, that is, the temperature of the one plate 10a side is reached. The evaporated hydrated water becomes water vapor and reaches the other plate 10b. When a temperature of the other plate 10b side is lower than the temperature of one plate 10a, the water vapor condenses and liquefies until a saturation water vapor pressure decreases to a saturation water vapor pressure at that temperature. The hydrated water liquefied flows down along the other plate 10b side of the slope 30 and reaches the reservoir portion Res via the intermediate side. Evaporation at the one plate 10a continues so that a water vapor pressure reduced due to condensation at the other plate 10b is compensated.

As described above, the water, which is a part of the latent heat storage material PCM and is the refrigerant HF, goes from the reservoir portion Res and returns to the reservoir portion Res again via the other plate 10b side, and the slope 30 is a circulation structure that allows circulation of the refrigerant HF. Here, the one plate 10a side of the slope 30 functions as an evaporator since water evaporates herein, and the other plate 10b side of the slope 30 functions as a condenser since water condenses herein. Accordingly, the one plate 10a side is deprived of evaporation heat and is cooled, and condensation heat is dissipated from the other plate 10*b* side. As a result, heat of the one plate 10*a* side transmits to the other plate 10*b* side. For example, in summer, by setting the one plate 10*a* as an indoor side, the heat is dissipated from a room interior without taking in moisture, and the room interior can be made comfortable.

On the other hand, when the room temperature is lower than an outdoor temperature in summer, there is no occurrence of evaporation of the hydrated water (more precisely, there is no proceeding of evaporation). For example, in a case where the room temperature is 27 degrees and the outdoor temperature is 30 degrees, once a saturation water vapor pressure at 27 degrees is reached, the hydrated water of the latent heat storage material PCM in the dissolved state reserved in the reservoir portion Res does not evaporate further, and the outer wall member 1 functions as a heat insulating wall.

Further, in a case where the room temperature is lower than the specific temperature as in winter, the latent heat storage material PCM is solidified regardless of the outdoor temperature, and is solidified in the reservoir portion Res. Therefore, the water in the solidified latent heat storage material PCM does not evaporate, and there is no occurrence that heat insulating performance decreases due to presence of water vapor. That is, in a case where the latent heat storage material PCM is liquefied, the slope 30 is saturated with refrigerant vapor (water vapor) and the vapor can freely move from and to the one plate 10*a* side and the other plate 10*b* side, and thus there is a limit to improvement of the heat insulating performance even when the pressure is low between the two plates 10. However, when the latent heat storage material PCM is solidified, the vapor is inhibited from moving around and the heat insulating performance is improved.

Here, in the present embodiment, the reservoir portion Res is formed at the one plate 10*a* side of the slope 30, and alternatively the slope 30 may not have a side wall on the one plate 10*a* side, and the reservoir portion Res may be formed by the slope 30 and the one plate 10*a*. In addition, the slope 30 is not limited to the structure illustrated in FIG. 1 as long as it is a circulation structure for circulating the refrigerant HF, and may be, for example, a simple inclined structure.

Next, an operation of the outer wall member 1 according to the present embodiment will be described with reference to FIG. 1. For example, it is assumed that a room temperature, such as one in winter, is lower than the specific temperature. At this time, water serving as the refrigerant is taken into crystal, and the latent heat storage material PCM of the inorganic salt hydrate is solidified in the reservoir portion Res. Therefore, there is no occurrence of circulation of the refrigerant HF, and the outer wall member 1 is in a non-operating state. In this non-operating state, the internal space (in the slope 30) between the two plates 10 is not filled with the refrigerant vapor, and a high heat insulating effect can be exhibited.

Generally, it is considered that the heat insulating performance can be improved by reducing the pressure between the two plates 10, but with respect to a structure having a refrigerant between the two plates 10 as in the present embodiment, an interior thereof is saturated with the refrigerant vapor, and the heat insulating performance at the time of non-operation is not so high. For example, an outer wall member in which the refrigerant HF is water has a heat transmission coefficient for a heat transmitting direction of about 5 W/m²·K, equivalent to that of average single glass, and has a heat transmission coefficient for a heat insulating direction of about 1.5 W/m²·K, equivalent to that of high performance insulating glass. Therefore, when the outer wall member is used as a window, good performance is obtained. However, as a wall, for example, a product having a heat transmission coefficient of 0.59 W/m²·K or less is required in a case of heat insulation by external adhesion on a wooden building in Tokyo, and therefore, it is preferable that the heat insulating performance thereof is higher at the time of non-operation. From such a viewpoint, the outer wall member 1 according to the present embodiment easily satisfies a requirement for serving as a wall.

On the other hand, when the room temperature is equal to or higher than the predetermined temperature and the outdoor temperature is lower than the room temperature, the water of the latent heat storage material PCM reserved in the reservoir portion Res evaporates. The evaporated water reaches the other plate 10*b* on the outdoor side, cools down and liquefies, flows down in the slope 30, and returns to the reservoir portion Res again. In this process, the one plate 10*a* is cooled down by evaporation heat due to evaporation of water, and condensation heat of water is dissipated from the other plate 10*b*. Accordingly, indoor heat is caused to transmit to the outside, and a cooling effect of cooling the room interior can be obtained.

Further, when the room temperature is about to rise from below the predetermined temperature to the specific temperature or higher during daytime in summer, an effect of maintaining the room temperature at the predetermined temperature in a process, in which the solidified latent heat storage material PCM is dissolving, is also obtained regardless of the outdoor temperature.

In this way, according to the outer wall member 1 of the first embodiment, when the temperature of the one plate 10*a* side is equal to or higher than the predetermined temperature, the first state is established and the refrigerant circulation is allowed, and when the temperature of the one plate 10*a* side is lower than the specific temperature, the second state is established and the refrigerant circulation is prohibited. For this reason, when the room temperature is high as in summer, for example, the refrigerant HF enters the first state and heat of the room interior can transmit to the outside. On the other hand, in winter, as long as the room temperature is not equal to or higher than the predetermined temperature, the temperature-sensitive means can enter the second state, and the refrigerant circulation can be prohibited to establish a non-operating state. Accordingly, it is possible to cause the heat of the room interior to transmit to the outside in summer, and to enter the non-operating state in winter to make it difficult for the heat to escape to the outside.

Further, since the latent heat storage material PCM is provided, which enters the second state due to solidification at a temperature lower than the specific temperature and prohibits the refrigerant circulation, the latent heat storage material PCM itself is solidified when the temperature of the one plate 10*a* side is lower than the specific temperature, and the refrigerant circulation is prohibited. Accordingly, by selecting the latent heat storage material PCM to be enclosed between the two plates 10, the refrigerant circulation can be prohibited to establish the non-operating state while reducing structural complexity. In particular, when the latent heat storage material PCM is solidified, there is no occurrence that the refrigerant vapor is filled between the two plates 10, and the heat insulating performance can be improved without causing the refrigerant vapor to move freely between the one plate 10*a* side and the other plate 10*b* side.

In addition, the outer wall member 1 is provided with the latent heat storage material PCM (including water that is the refrigerant HF) between the two plates 10, which enters the first state of being dissolved at the predetermined temperature or higher and enters the second state of being solidified below the specific temperature. Therefore, for example, even in a situation where an outdoor temperature is higher than an indoor temperature and the indoor temperature is about to rise from below the predetermined temperature to the predetermined temperature or higher, an effect that the room temperature is maintained when the latent heat storage material PCM dissolves is exhibited, and the indoor temperature can be suppressed.

Further, since the latent heat storage material PCM is an inorganic salt hydrate and the hydrated water thereof functions as the refrigerant HF when the latent heat storage material PCM is dissolved, it is possible to perform refrigerant circulation using the water as the refrigerant HF, and to design a vapor pressure or the like, which is based on water, at the time of performing the refrigerant circulation.

Although an example in which the latent heat storage material PCM is used has been described in the first embodiment, the present invention is not limited thereto, and a gelling agent (containing a refrigerant HF (for example, water) may be provided, which enters the first state of being dissolved when a temperature is equal to or higher than the predetermined temperature and enters a second state of being gelled when the temperature is lower than the specific temperature. This is because the same effect as that described above can be obtained accordingly. The gelling agent is, for example, a mixture of gelatin with water. Such a gelling agent dissolves at 25 degrees or more and 35 degrees or less after solidification, and water thereof can be used as the refrigerant HF. In addition, the dissolved gelling agent may be gelled at 15 degrees or more and less than 25 degrees to secure the water.

Next, a second embodiment of the present invention will be described. An outer wall member according to the second embodiment is similar to that of the first embodiment, but is partially different in configuration. Hereinafter, differences from the first embodiment will be described.

Figure 2:
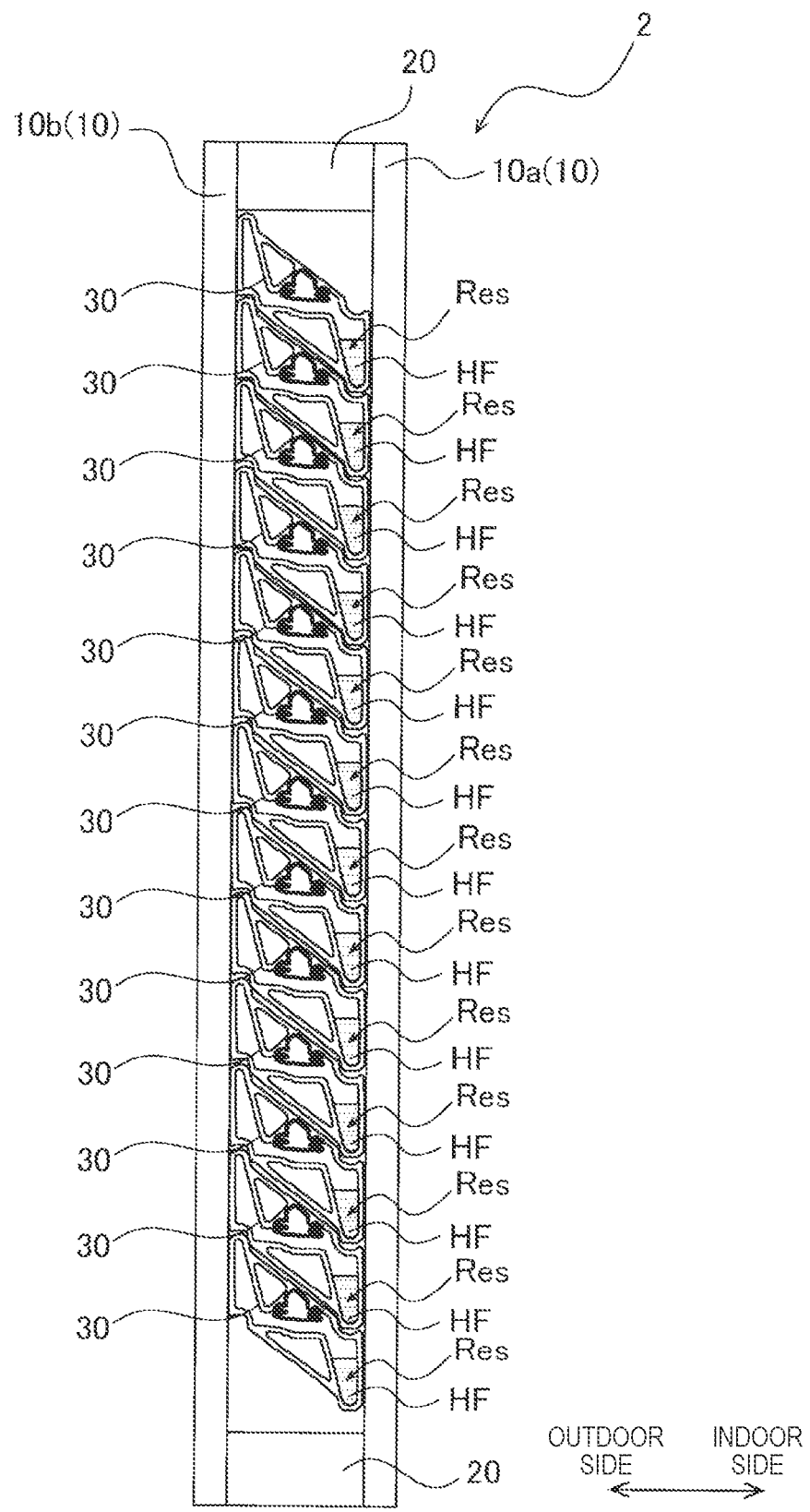
FIG. 2 is a cross-sectional view of an outer wall member according to a second embodiment.

FIG. 2 is a cross-sectional view of the outer wall member according to the second embodiment. As illustrated in FIG. 2, in the outer wall member 2 according to the second embodiment, a shape of the slope 30 is different from that in the first embodiment. Further, in the second embodiment, the latent heat storage material PCM is not provided, and water as the refrigerant HF is provided. In addition, the outer wall member 2 according to the second embodiment includes a valve body (see FIGS. 3A and 3B: temperature-sensitive means) V.

Figure 3A:
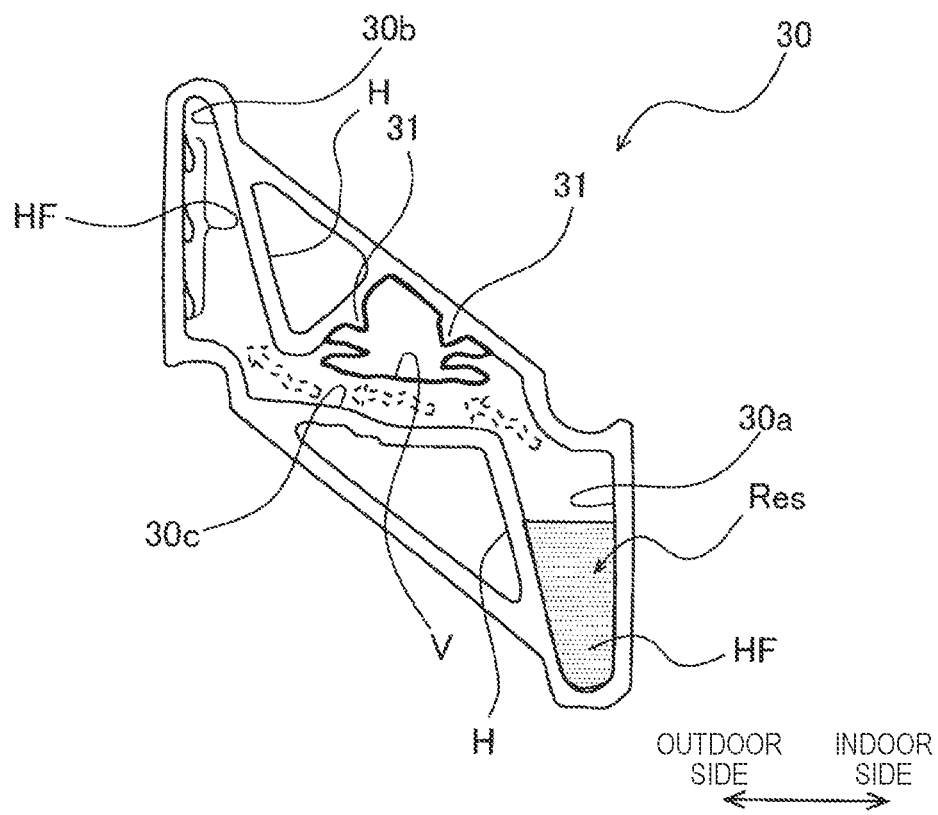
Figure 3B:
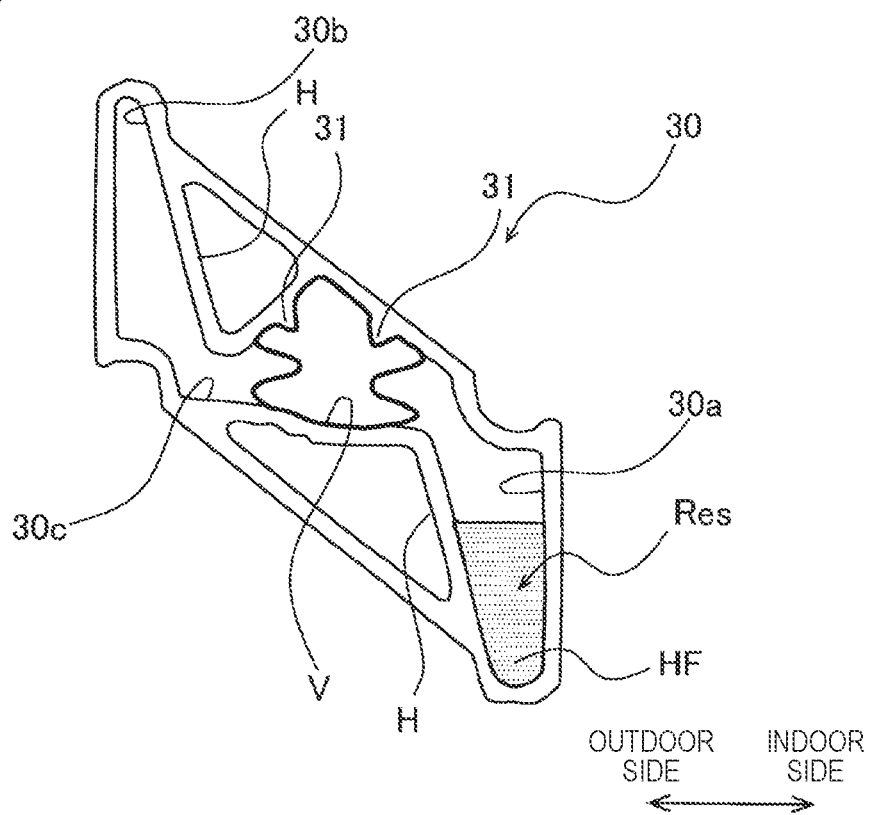

FIGS. 3A and 3B illustrate a partially enlarged view of the configuration illustrated in FIG. 2, in which FIG. 3A illustrates a first state, and FIG. 3B illustrates a second state. As illustrated in FIGS. 3A and 3B, the slope 30 according to the second embodiment is manufactured by extrusion molding of resin or aluminum. The slope 30 is formed with a first cavity 30a on one plate 10a side, a second cavity 30b on the other plate 10b side, and an intermediate cavity (flow path) 30c that connects the first cavity 30a (reservoir portion Res) and the second cavity 30b (the other plate 10b side). In the slope 30, the first cavity 30a, the second cavity 30b, and the intermediate cavity 30c are connected to form a cavity portion having a substantially N shape in cross section.

The first cavity 30a functions as the reservoir portion Res for the refrigerant HF. The intermediate cavity 30c has an inclined structure in which a first cavity 30a side is lower than a second cavity 30b side. Further, the valve body V is attached to an upper wall of the intermediate cavity 30c in the slope 30. Two projections 31 are formed on the upper wall of the intermediate cavity 30c, and the valve body V has a substantially star shape in cross section. The two projections 31 are fitted into recessed portions of the substantially star-shaped valve body V to prevent the valve body V from falling off.

Such a valve body V is constituted by a hollow tube having an internal pressure (specifically, $1/1000$ atm or less) lower than the atmospheric pressure. When a temperature of the one plate 10a side is equal to or higher than a predetermined temperature, the valve body V is pressed to contract due to rising of a refrigerant vapor pressure in the slope 30 and enters a state of leaving the intermediate cavity 30c open to allow refrigerant circulation. On the other hand, when the temperature of the one plate 10a side is lower than a specific temperature, the refrigerant vapor pressure in the slope 30 decreases and the valve body V expands, thereby closing the intermediate cavity 30c to prohibit the refrigerant circulation.

Specifically, in the second embodiment, it is assumed that the refrigerant HF is water and a pressure in the slope 30 is reduced to about $1/1000$ atm. Here, when the temperature of the one plate 10a side rises to, for example, 26 degrees (predetermined temperature), the pressure in the slope 30 naturally increases to about $35/1000$ atm. Meanwhile, since an interior of the valve body V is at, for example, about $1/1000$ atm, the valve body V is pressed to contract. At this time, since the valve body V is attached to the upper wall of the intermediate cavity 30c, a bottom surface of the valve body V is pulled up in contraction of the valve body V so that the first cavity 30a and the second cavity 30b are connected to each other. On the other hand, when the temperature of the one plate 10a side decreases and the pressure in the slope 30 drops below $30/1000$ atm, the valve body V expands to restore an initial shape, thereby closing the intermediate cavity 30c.

Here, it is preferable that the slope 30 has a shape such that a plurality of the slopes 30 match with each other without a gap therebetween when arranged in a vertical direction as illustrated in FIG. 2. Specifically, the slope 30 has a substantially parallelogram external form, and includes a hollow portion H having an internal pressure (for example, about $1/1000$ atm) lower than the atmospheric pressure, in portions other than the first cavity 30a, the second cavity 30b, and the intermediate cavity 30c. By providing the hollow portion H, an entire external firm of the slope 30 is substantially parallelogram-shaped, and the plurality of slopes 30 can be arranged in a vertical direction without a gap therebetween. Further, since the hollow portion H having a low internal pressure is provided, the heat insulating performance can be improved.

Next, an operation of the outer wall member 2 according to the present embodiment will be described with reference to FIG. 2 and FIGS. 3A and 3B. For example, it is assumed that a room temperature, such as one in winter, is lower than the specific temperature. At this time, as illustrated in FIG. 3B, the valve body V is in an expanded state due to a decrease in the refrigerant vapor pressure in the slope 30. Accordingly, the valve body V is in a state of closing the intermediate cavity 30c, and the refrigerant circulation between the first cavity 30a and the second cavity 30b is prohibited and the outer wall member 2 is set to a non-operating state.

On the other hand, when the room temperature is equal to or higher than the predetermined temperature, the refrigerant vapor pressure in the slope 30 rises, and the valve body V enters a contracted state as illustrated in FIG. 3A due to rising of the refrigerant vapor pressure in the slope 30. Accordingly, the valve body V is in a state of leaving the intermediate cavity 30c open, and the refrigerant circulation between the first cavity 30a and the second cavity 30b is allowed.

Further, when the room temperature is equal to or higher than the predetermined temperature and the outdoor temperature is lower than the room temperature, evaporation of the refrigerant HF reserved in the reservoir portion Res proceeds. The evaporated refrigerant HF reaches the second cavity 30b on the outdoor side, liquefies by being cooled down, flows down in the slope 30, and returns to the reservoir portion Res again. In this process, the one plate 10a is cooled down by evaporation heat due to evaporation of the refrigerant HF, and condensation heat of the refrigerant HF is dissipated from the other plate 10b. Accordingly, indoor heat is caused to transmit to the outside, and a cooling effect of cooling the room interior can be obtained.

In this way, according to the outer wall member 2 of the second embodiment, as in the first embodiment, it is possible to cause the heat of the room interior to transmit to the outside in summer, and to enter the non-operating state in winter to make it difficult for the heat to escape to the outside.

Furthermore, according to the second embodiment, since the valve body V is provided, which closing the intermediate cavity 30c and leaves the intermediate cavity 30c open, the intermediate cavity 30c can be left open or closed by the operation of the valve body V.

In addition, the valve body V is constituted by a hollow tube having an internal pressure lower than the atmospheric pressure, and the valve body V can be operated using the refrigerant vapor pressure to leave open or close the intermediate cavity 30c. Further, in a case where the hollow tube closes the intermediate cavity 30c, the heat insulating performance can be further improved by providing a lower pressure heat insulating portion in the middle of the intermediate cavity 30c.

Figure 4:
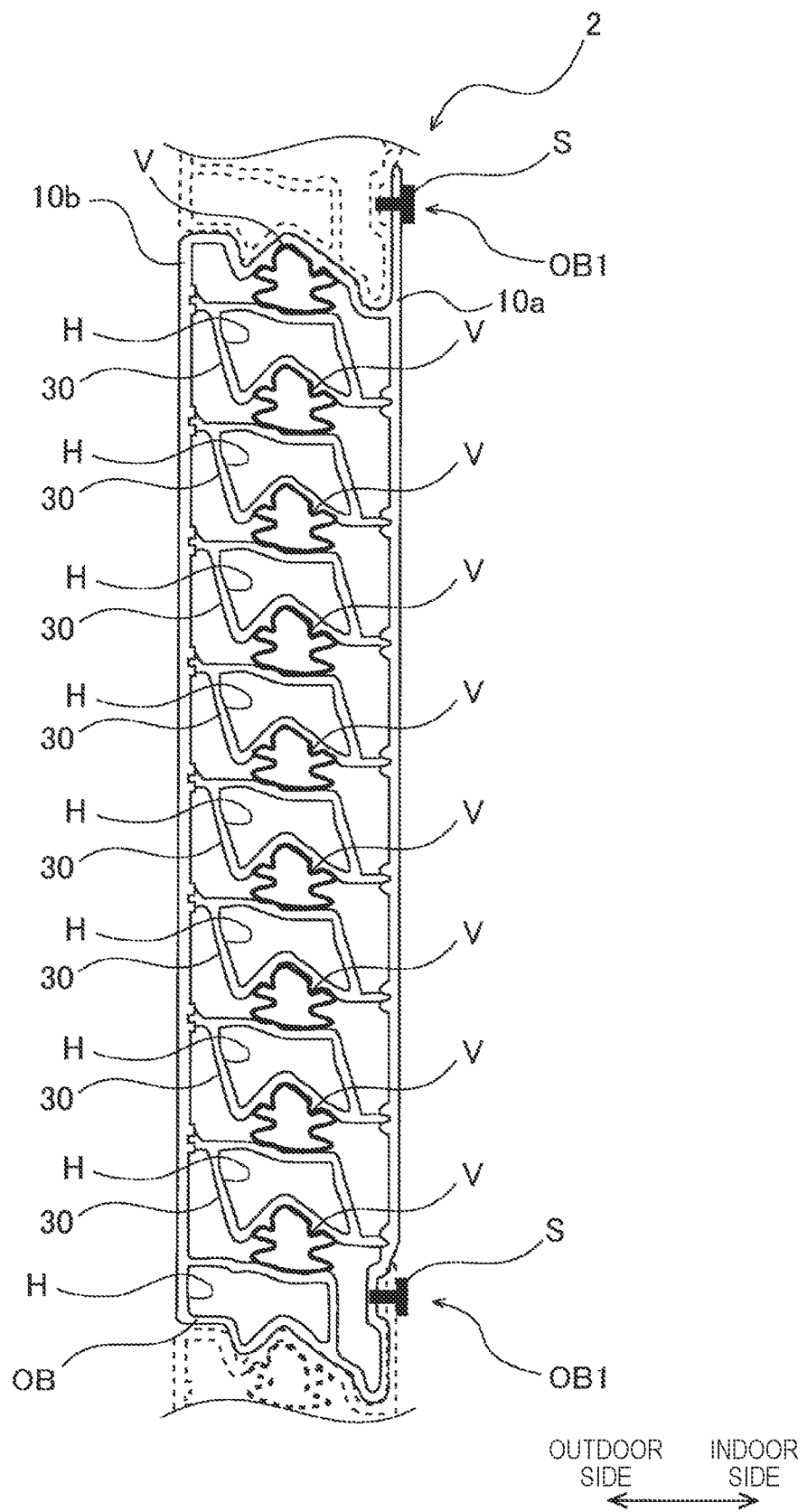
FIG. 4 is a cross-sectional view of an outer wall member according to a modification of the second embodiment.

Here, the outer wall member 2 according to the second embodiment may be configured as illustrated in FIG. 4. FIG. 4 is a cross-sectional view of the outer wall member 2 according to a modification of the second embodiment, and FIG. 5 is a cross-sectional view of a part of the configuration illustrated in FIG. 4.

Figure 5:
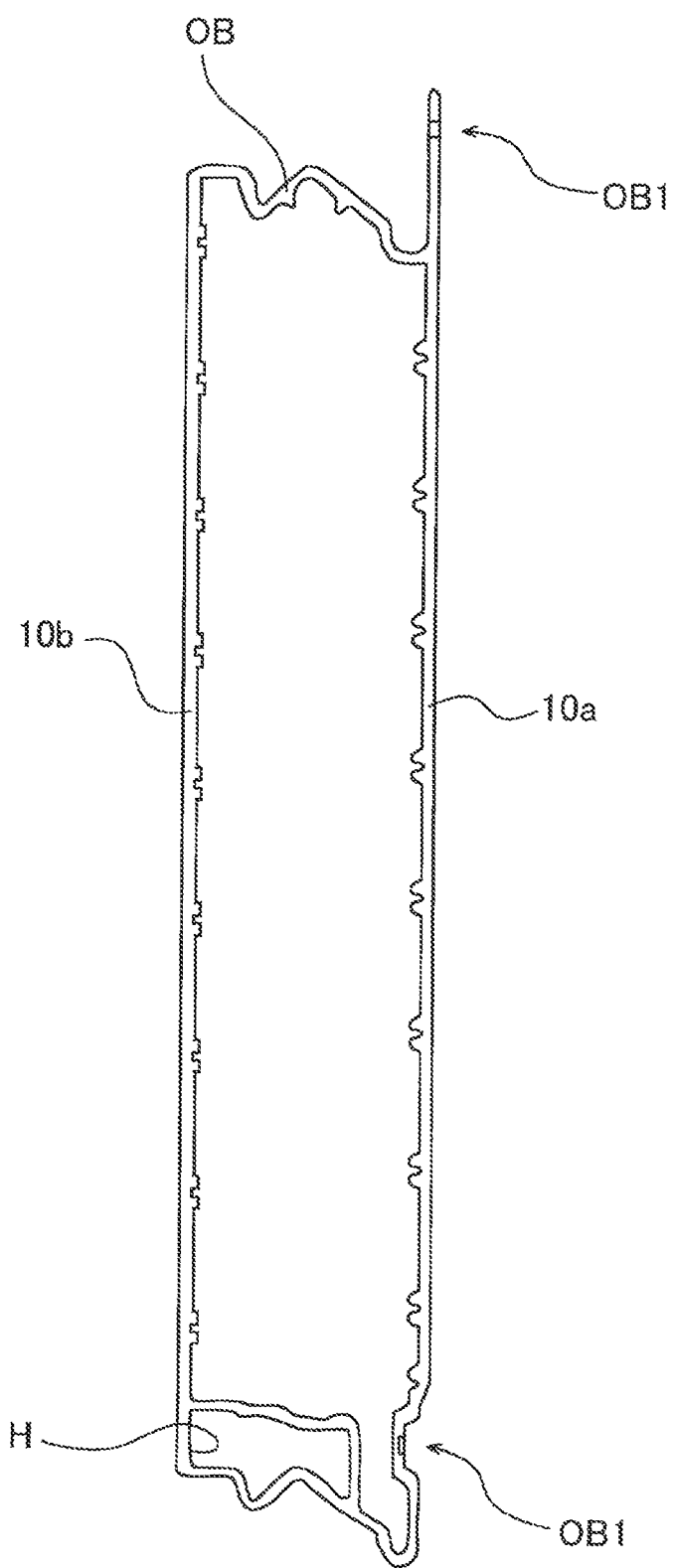
FIG. 5 is a cross-sectional view of a part of the configuration illustrated in FIG. 4.

As illustrated in FIGS. 4 and 5, in the outer wall member 2 according to the modification, a plurality of slopes 30 are accommodated in an outer case OB formed by extrusion molding of aluminum or the like. As illustrated in FIG. 5, the outer case OB is formed by connecting upper portions of the one plate 10a and the other plate 10b and connecting lower portions thereof.

Further, outer cases OB having the same shape as the outer case OB can be fitted and connected to the outer case OB from above and below. Further, a screw fastening portion OB1 is provided, and an upper outer case OB can be fitted to the outer case OB after a lower outer case OB is fixed to a wall or the like thereof using a screw S. In addition, the hollow portion H is formed above and below each valve body V of the plurality of slopes 30. Therefore, the plurality of valve bodies V and the plurality of hollow portions H are vertically connected, and when the valve body V is in an expanded state such as in winter, the valve body V and the hollow portion H can exhibit high heat insulating performance.

Next, a third embodiment of the present invention will be described. An outer wall member according to the third embodiment is similar to that of the first embodiment, but is partially different in configuration. Hereinafter, differences from the first embodiment will be described.

Figure 6A:
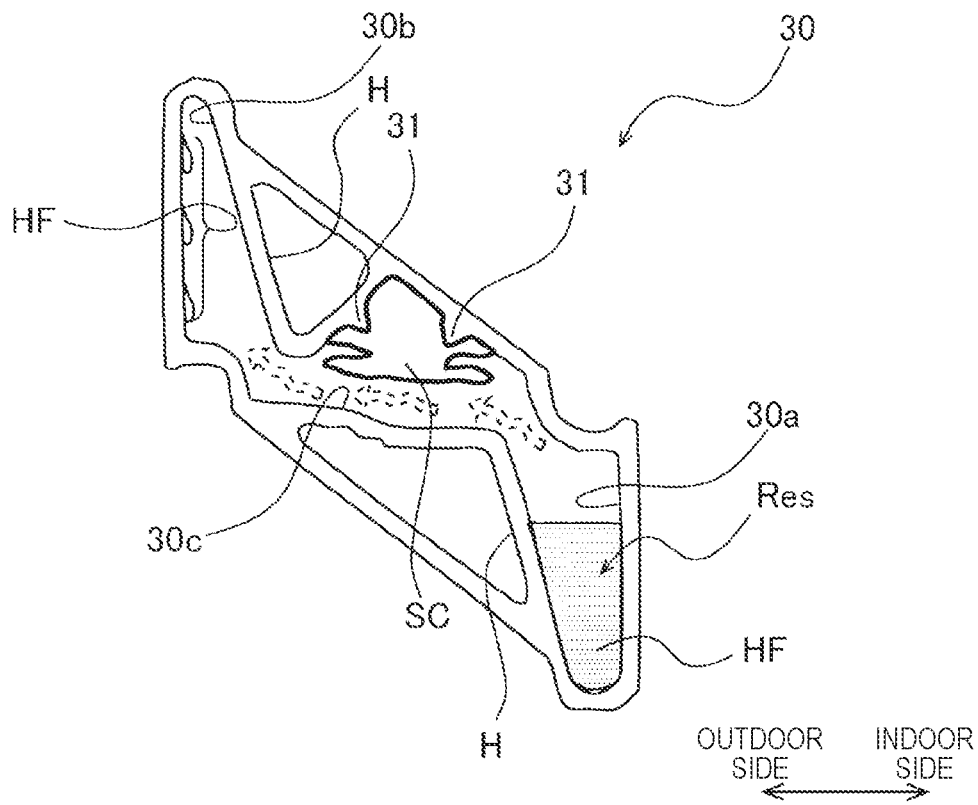
Figure 6B:
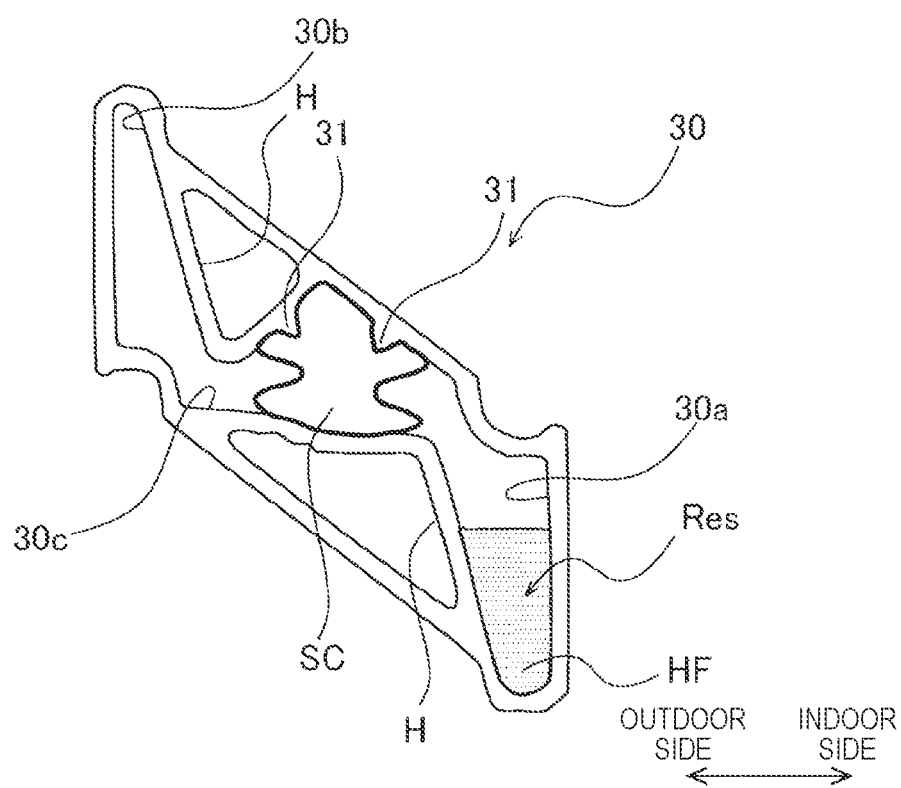

FIGS. 6A and 6B illustrate an enlarged view of a partial configuration of the outer wall member according to the third embodiment, in which FIG. 6A illustrates a first state, and FIG. 6B illustrates a second state. As illustrated in FIGS. 6A and 6B, the outer wall member 2 according to the third embodiment includes a water stop cord. SC instead of the valve body V. Similarly to the valve body V, the water stop cord SC has a substantially star shape, and the projection 31 formed on an upper wall of the intermediate cavity 30c is fitted into a recessed portion of the water stop cord SC to prevent the water stop cord SC from falling off.

Such a water stop cord SC is configured to have a temperature-sensitive water absorption polymer, which exhibits hydrophobicity to enter a dry state when a temperature of the one plate 10a side is equal to or higher than a predetermined temperature, and which exhibits hydrophobicity to enter a swelling state when the temperature of the one plate 10a side is lower than a specific temperature. The water stop cord SC contracts when the polymer is in a dry state, and enters a first state of leaving the intermediate cavity 30c open as illustrated in FIG. 6A. On the other hand, when the polymer is in the swelling state, the water stop cord SC expands until reaching a peripheral wall of the intermediate cavity 30c as illustrated in FIG. 6B, and enters a second state of closing the intermediate cavity 30c.

Next, an operation of the outer wall member 2 according to the third embodiment will be described with reference to FIGS. 6A and 6B. For example, it is assumed that a room temperature, such as one in winter, is lower than the specific temperature. At this time, the water stop cord SC exhibits water absorbability, and as illustrated in FIG. 6B, enters the swelling state after absorbing water serving as the refrigerant HF. At this time, the water stop cord SC is in a state of closing the intermediate cavity 30c, and refrigerant circulation between the first cavity 30a and the second cavity 30b is prohibited and the outer wall member 2 is set to a non-operating state.

On the other hand, when the room temperature is equal to or higher than the predetermined temperature, the water stop cord SC exhibits hydrophobicity and enters the dry state after releasing the water serving as the refrigerant HF. At this time, the water stop cord SC contracts to enter a state of leaving the intermediate cavity 30c open as illustrated in FIG. 6A, and the refrigerant circulation between the first cavity 30a and the second cavity 30b is allowed.

Further, when the room temperature is equal to or higher than the predetermined temperature and the outdoor temperature is lower than the room temperature, the refrigerant HF reserved in the reservoir portion Res evaporates. The evaporated refrigerant HF reaches the second cavity 30b on the outdoor side, liquefies by being cooled down, flows down in the slope 30, and returns to the reservoir portion Res again. In this process, the one plate 10a is cooled down by evaporation heat due to evaporation of the refrigerant HF, and condensation heat of the refrigerant HF is dissipated from the other plate 10b. Accordingly, indoor heat is caused to transmit to the outside, and a cooling effect of cooling the room interior can be obtained.

In this way, according to the outer wall member 2 of the third embodiment, as in the first embodiment, it is possible to cause the heat of the room interior to transmit to the outside in summer, and to enter the non-operating state in winter to make it difficult for the heat to escape to the outside.

Further, the outer wall member 2 according to the third embodiment includes the water stop cord SC. When the temperature of the one plate 10a side is equal to or higher than the predetermined temperature, the water stop cord SC exhibits hydrophobicity and enters the dry state, and accordingly enters the first state of leaving the intermediate cavity 30c open. When the temperature of the one plate 10a side is lower than the specific temperature, the water stop cord SC exhibits water absorbability and enters the swelling state, and accordingly enters the second state of closing the intermediate cavity 30c. Therefore, a flow path of a structural body that is long in a plane direction can be preferably closed and left open by using an elongated member, that is, the water stop cord SC.

Although an example in which the intermediate cavity 30c is left open or closed by the water stop cord SC has been described in the third embodiment, the present invention is not limited thereto, and, for example, the temperature-sensitive water absorption polymer may be provided in the reservoir portion Res or the like. In this case, when the temperature of the one plate 10a side is equal to or higher than the predetermined temperature, the temperature-sensitive water absorption polymer exhibits hydrophobicity and enters the first state of releasing the water serving as the refrigerant HF, and the refrigerant circulation is allowed. On the other hand, when the temperature of the one plate 10a side is lower than the specific temperature, the temperature-sensitive water absorption polymer exhibits water absorbability and enters the second state of absorbing the water serving as the refrigerant HF, and the refrigerant circulation is prohibited. In this configuration, the temperature-sensitive water absorption polymer corresponding to the amount of water serving as the refrigerant HF, may be enclosed between the two plates 10, and the non-operating state can be realized with a simple structure.

Next, a fourth embodiment of the present invention will be described. In the fourth embodiment, a structural body used for a roofing member will be described. The roofing member is similar to the outer wall member 2 according to the modification of the second embodiment, but is partially different in configuration. Hereinafter, differences from the second embodiment will be described.

Figure 7:
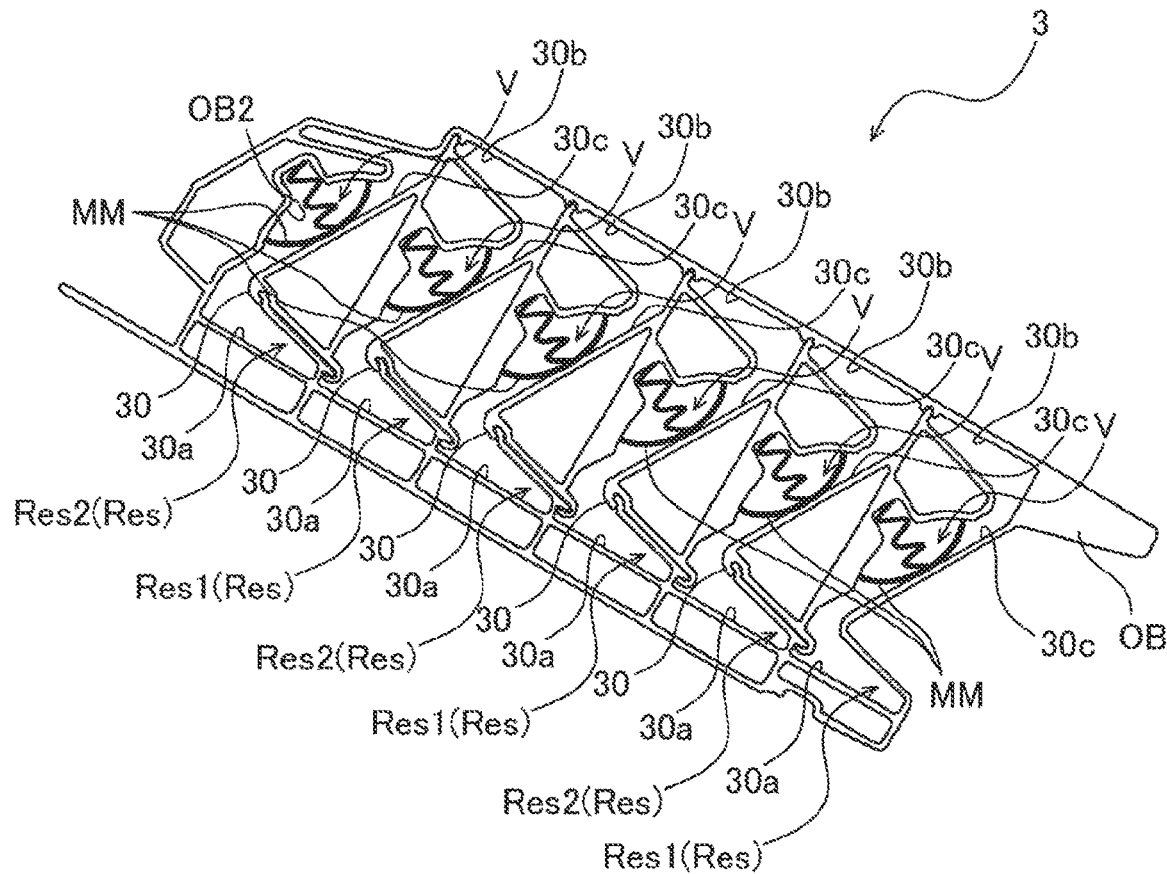
FIG. 7 is a cross-sectional view of a roofing member according to a fourth embodiment.
Figure 8:
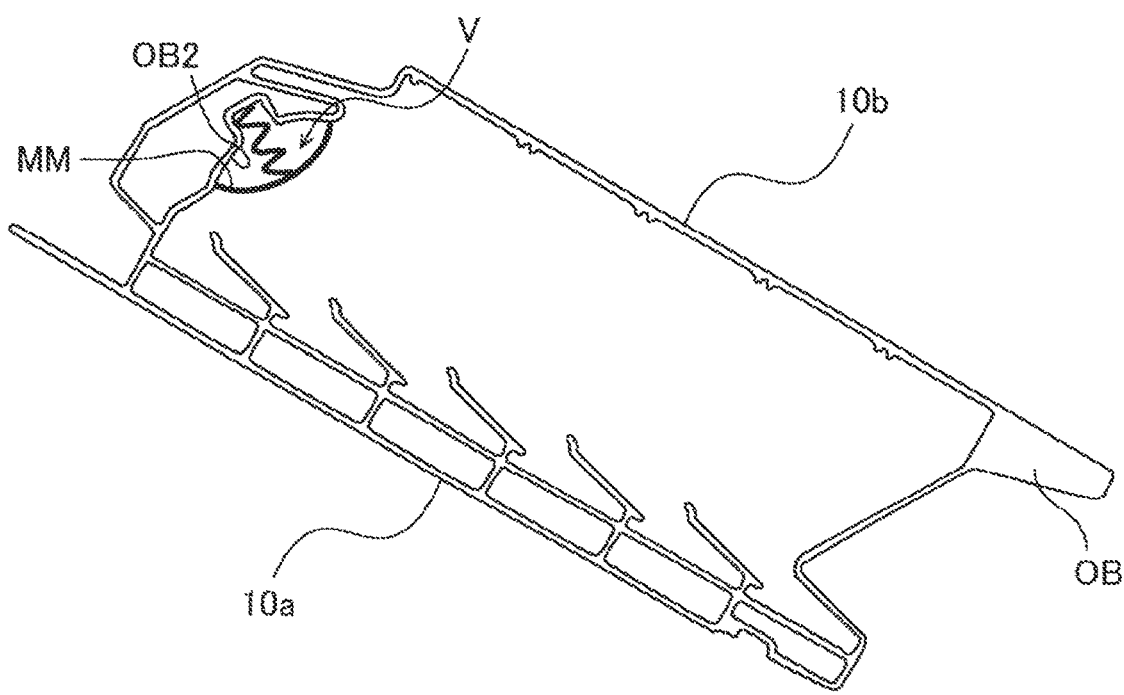
FIG. 8 is a cross-sectional view of a part of the configuration illustrated in FIG. 7.
Figure 9A:
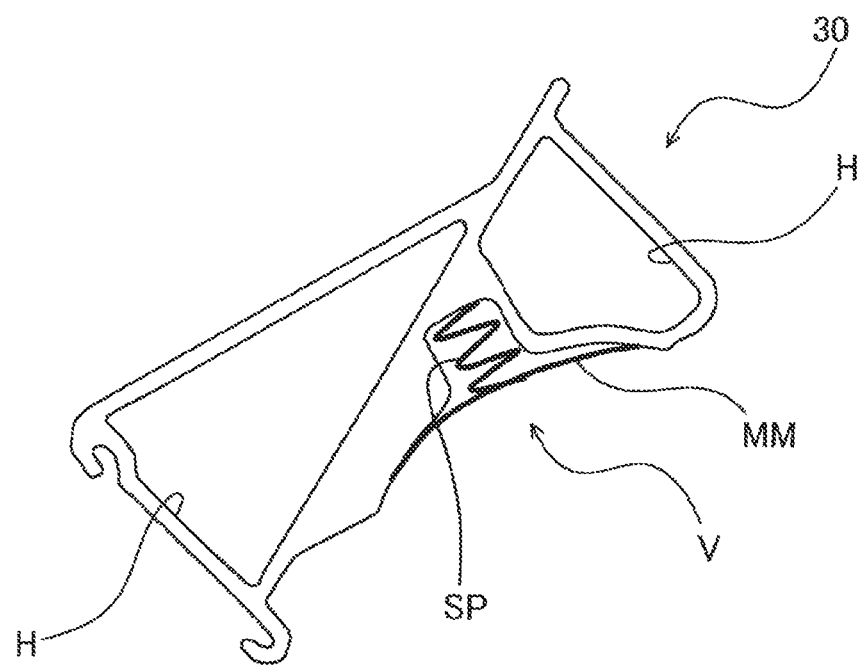
Figure 9B:
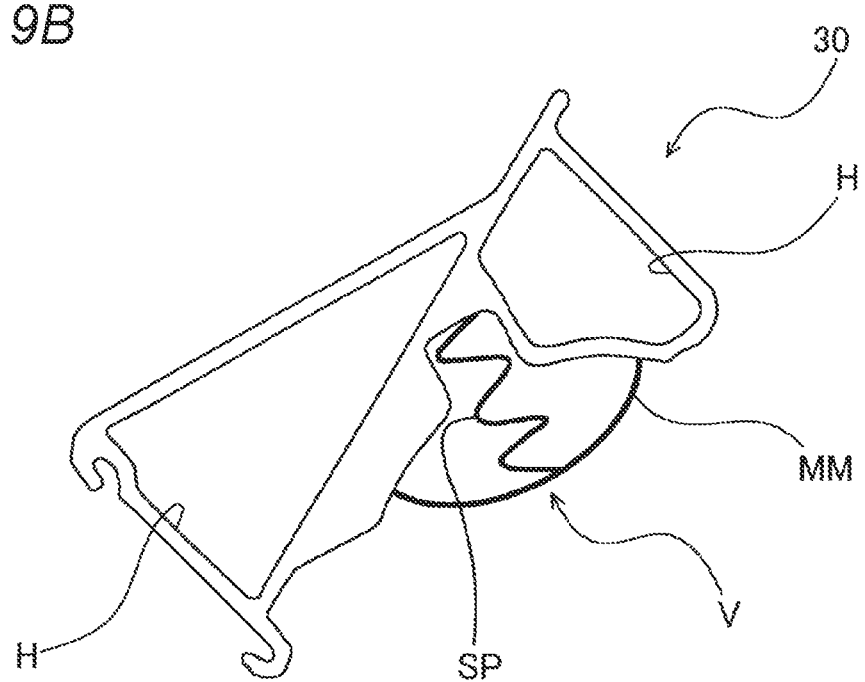

FIG. 7 is a cross-sectional view of the roofing member according to the fourth embodiment, and FIG. 8 is a cross-sectional view of a part of the configuration illustrated in FIG. 7. FIGS. 9A and 9B illustrate an enlarged view of a partial configuration illustrated in FIG. 7, in which FIG. 9A illustrates a first state, and FIG. 9B illustrates a second state.

As illustrated in FIGS. 7 and 8, the roofing member 3 includes a plurality of slopes 30 and an outer case OB similarly to the outer wall member 2 according to the modification of the second embodiment. The outer case OB is provided on an inclined surface, and one plate 10a (see FIG. 8) is at an indoor ceiling side, and the other plate 10b (see FIG. 8) is at a sky side. Further, similarly to the second embodiment, outer cases OB having the same shape as the outer case OB can be fitted and connected to the outer case OB in an upper-lower direction along the inclined surface.

In addition, in the fourth embodiment, the valve body V is attached to an upper wall OB2 of the slope 30 and the outer case OB. As illustrated in FIGS. 9A and 9B, the valve body V includes a spring SP and a membranous member MM. The membranous member MM is attached to the slope 30. Further, in the fourth embodiment, as illustrated in FIG. 7, a first cavity 30a on the one plate 10a side, a second cavity 30b on the other plate 10b side, and an intermediate cavity 30c connecting both are formed between slopes that are adjacent to each other in the upper-lower direction. The membranous member MM is provided in the intermediate cavity 30c.

The spring SP illustrated in FIGS. 9A and 9B is for operating the membranous member MM, and is disposed in a space sandwiched between the membranous member MM and the slope 30. An internal pressure of the space is set to, for example, about $1/1000$ atm. The spring SP is not limited to being continuous in a depth direction of the drawing, and may be arranged at regular intervals in the direction.

In the fourth embodiment, when a temperature of the one plate 10a side is equal to or higher than a predetermined temperature, the membranous member MM is pushed by a vapor pressure of the intermediate cavity 30c (see FIG. 7) and the spring SP enters a contracted state, as illustrated in FIG. 9A. That is, the membranous member MM is in a state of being retracted to an attached side (a side where the spring SP is attached in the membranous member MM). Therefore, the valve body V enters a first state of leaving the intermediate cavity 30c (see FIG. 7) open. On the other hand, when the temperature of the one plate 10a side is lower than a specific temperature, the spring SP is in an extended state under a biasing force as illustrated in FIG. 9B, and is pushed back until the membranous member MM closes the intermediate cavity 30c (see FIG. 7). That is, the film member MM is in a state of protruding to a side opposite from the attached side (a side where the spring SP is not attached in the membranous member MM). Therefore, the valve body V enters a second state of closing the intermediate cavity 30c (see FIG. 7).

The spring SP may be constituted by a shape memory spring that extends when the temperature of the one plate 10a side is equal to or higher than the predetermined temperature, and contracts when the temperature of the one plate 10a side is lower than the specific temperature.

Further, as illustrated in FIG. 7, the roofing member 3 according to the fourth embodiment includes a first reservoir portion Res1 in which a latent heat storage material is enclosed, and a second reservoir portion Res2 in which water is enclosed. Therefore, in the fourth embodiment, for example, a vicinity of a ceiling portion is cooled by the latent heat storage material during the day, and heat absorbed by the latent heat storage material in the first reservoir portion Res1 can be dissipated to the outside at dawn or the like through the water of the adjacent second reservoir portion Res2. As described above, the roofing member 3 according to the fourth embodiment has a structure that enhances dissipation of heat absorbed by the latent heat storage material.

Next, an operation of the roofing member 3 according to the fourth embodiment will be described with reference to FIGS. 7 to 9B. For example, it is assumed that a room temperature at the ceiling portion, such as one in winter, is lower than the specific temperature. In this case, as illustrated in FIG. 9B, the spring SP of the valve body V is in the extended state. Accordingly, the membranous member MM is in the state of closing the intermediate cavity 30c, and the refrigerant circulation between the first cavity 30a and the second cavity 30b is prohibited and the roofing member 3 is set to a non-operating state.

On the other hand, when the room temperature at the ceiling portion is equal to or higher than the predetermined temperature, the spring SP of the valve body V enters the contracted state as illustrated in FIG. 9A. Accordingly, the membranous member MM is in the state of leaving the intermediate cavity 30c open, and the refrigerant circulation between the first cavity 30a and the second cavity 30b is allowed. Further, the latent heat storage material dissolves in the first reservoir portion Res1.

Further, when the room temperature is equal to or higher than the predetermined temperature and the outdoor temperature is lower than the room temperature, the refrigerant reserved in the reservoir portion Res evaporates. The evaporated refrigerant reaches the second cavity 30b on the outdoor side, liquefies by being cooled down, flows down the slope 30, and returns to the reservoir portion Res again. In this process, the one plate 10a is cooled down by evaporation heat due to evaporation of the refrigerant, and condensation heat of the refrigerant is dissipated from the other plate 10b. Accordingly, indoor heat is caused to transmit to the outside, and a cooling effect of cooling the room interior can be obtained.

In this way, according to the roofing member 3 of the fourth embodiment, as in the second embodiment, it is possible to cause the heat of the room interior to transmit to the outside in summer, and to enter the non-operating state in winter to make it difficult for the heat to escape to the outside. Further, the intermediate cavity 30c can be left open or closed by the operation of the valve body V.

Further, according to the fourth embodiment, in a case where the pressure in the space formed by the membranous member MM and the slope 30 is set to be lower than the atmospheric pressure, a low pressure heat insulating portion is provided in the middle of the intermediate cavity 30c at the time of closing the intermediate cavity 30c. Accordingly, the heat insulating performance can be further improved.

In addition, since hollow portions H are formed in upper and lower portions of the valve body V along the inclined surface, the plurality of valve bodies V and the plurality of hollow portions H are vertically connected, and when the valve body V closes the intermediate cavity 30c in winter or the like, the valve body V and the hollow portion H can exhibit high heat insulating performance.

Further, with respect to a portion where the latent heat storage material is to be provided, as long as the refrigerant vapor is not filled between the two plates 10 when the latent heat storage material is solidified, and the heat insulating performance can be improved without causing the refrigerant vapor to move freely between the one plate 10a side and the other plate 10b side, any position is fine.

Further, since the valve body V includes the membranous member MM and the spring SP, the first state and the second state can be switched by operating the membranous member MM using the spring SP.

Although in the fourth embodiment, the valve body V includes the membranous member MM and the spring SP, the present invention is not limited thereto. The membranous member MM may be constituted by a bimetal or the like, and the membranous member MM itself may switch between the first state and the second state according to a thermal environment. In this case, when the temperature of the one plate 10a side is equal to or higher than the predetermined temperature, the membranous member MM is in a state of being retracted to the attached side and enters the first state of leaving the flow path open; when the temperature of the one plate 10a side is lower than the specific temperature, the membranous member MM is in a state of protruding to the side opposite from the attached side and enters the second state of closing the flow path. In this case, the spring SP is not provided, and the configuration can be simplified.

Next, a fifth embodiment of the present invention will be described. A roofing member according to the fifth embodiment is similar to that of the fourth embodiment, but is partially different in configuration. Hereinafter, differences from the fourth embodiment will be described.

FIG. 10 is a cross-sectional view of the roofing member according to the fifth embodiment. FIGS. 11A and 11B illustrate a perspective view of a part of the configuration illustrated in FIG. 10, in which FIG. 11A illustrates a first state, and FIG. 11B illustrates a second state.

A roofing member 4 according to the fifth embodiment includes a plate member P as illustrated in FIG. 10. The plate member P is a plate member provided in the intermediate cavity 30c so as to close communication between the first cavity 30a and the second cavity 30b. The plate member P is an elongated plate member that is continuous in the depth direction of the drawing of FIG. 10. Further, as illustrated in FIGS. 11A and 11B, a plurality of through holes TH are formed in the plate member P. The plate member P is formed separately from the slope 30, but is not limited thereto, and may be integrated with the slope 30 and configured as a part of the slope 30.

The roofing member 4 according to the fifth embodiment includes, as the valve body V, a bimetal BM that can leave open and close the through hole TH. The bimetal BM enters a first state of leaving the through hole TH open as illustrated in FIG. 11A when a temperature of the one plate 10a side is equal to or higher than the predetermined temperature, and enters a second state of closing the through hole TH as illustrated in FIG. 11B when the temperature of the one plate 10a side is lower than a specific temperature.

Such a bimetal BM is formed by bonding two kinds of metals having different coefficients of thermal expansion. The bimetal BM is not limited thereto, and may be firmed by bonding, for example, a silicone resin having a high coefficient of thermal expansion and a carbon fiber having a coefficient of thermal expansion of substantially zero. Further, a permanent magnet and a temperature-sensitive ferrite may be attached to a tip of the bimetal BM and the plate member P, respectively, and configured as follows. That is, at a specific temperature or higher, the temperature-sensitive ferrite is paramagnetic and does not inhibit opening between the tip of the bimetal BM and the plate member P. On the other hand, at a temperature lower than the specific temperature, the temperature-sensitive ferrite is ferromagnetic, and the tip of the bimetal BM comes into close contact with the plate member P to reliably close the through hole TH.

Next, an operation of the roofing member 4 according to the fifth embodiment will be described with reference to FIG. 10 and FIGS. 11A and 11B. For example, it is assumed that a room temperature at the ceiling portion, such as one in winter, is lower than the specific temperature. At this time, the bimetal BM is in a state of closing the through hole TH as illustrated in FIG. 11B, and refrigerant circulation between the first cavity 30a and the second cavity 30b is prohibited and the roofing member 4 is set to a non-operating state.

On the other hand, when the room temperature at the ceiling portion is equal to or higher than the predetermined temperature, the bimetal BM is in a state of leaving the through hole TH open as illustrated in FIG. 11A. Accordingly, the refrigerant circulation between the first cavity 30a and the second cavity 30b is allowed.

Further, when the room temperature is equal to or higher than the predetermined temperature and an outdoor temperature is lower than the room temperature, a refrigerant reserved in the reservoir portion Res evaporates. The evaporated refrigerant reaches the second cavity 30b on an outdoor side, liquefies by being cooled down, flows down the slope 30, and returns to the reservoir portion Res again. In this process, the one plate 10a is cooled down by evaporation heal due to evaporation of the refrigerant, and condensation heat of the refrigerant HF is dissipated from the other plate 10b. Accordingly, indoor heat is caused to transmit to the outside, and a cooling effect of cooling the room interior can be obtained.

In this way, according to the roofing member 4 of the fifth embodiment, as in the fourth embodiment, it is possible to cause heat of a room interior to transmit to the outside in summer, and to enter the non-operating state in winter to make it difficult for the heat to escape to the outside.

Further, according to the fifth embodiment, the plate member P is provided, and the first state and the second state can be switched by leaving open or closing the through hole TH using the bimetal BM.

Next, a sixth embodiment of the present invention will be described. A roofing member according to the sixth embodiment is similar to that of the fourth embodiment, but is partially different in configuration. Hereinafter, differences from the fourth embodiment will be described.

Figure 12:
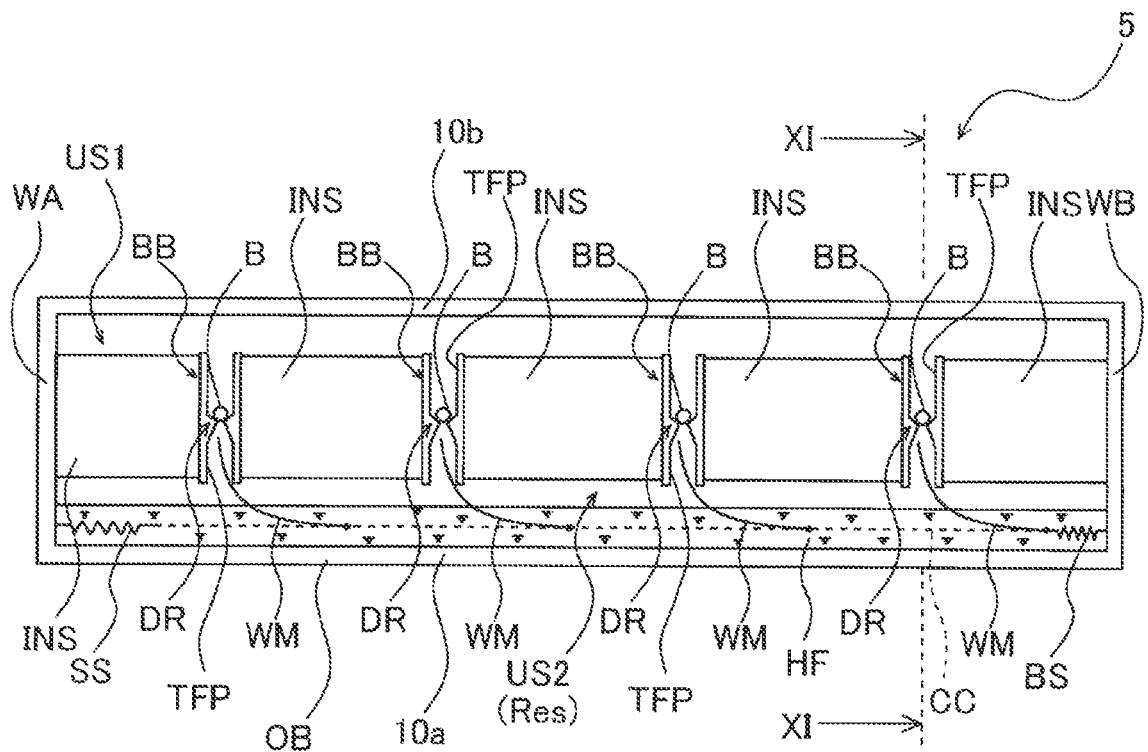
FIG. 12 is a first cross-sectional view of a roofing member according to a sixth embodiment, illustrating a cross section in a horizontal direction.
Figure 13:
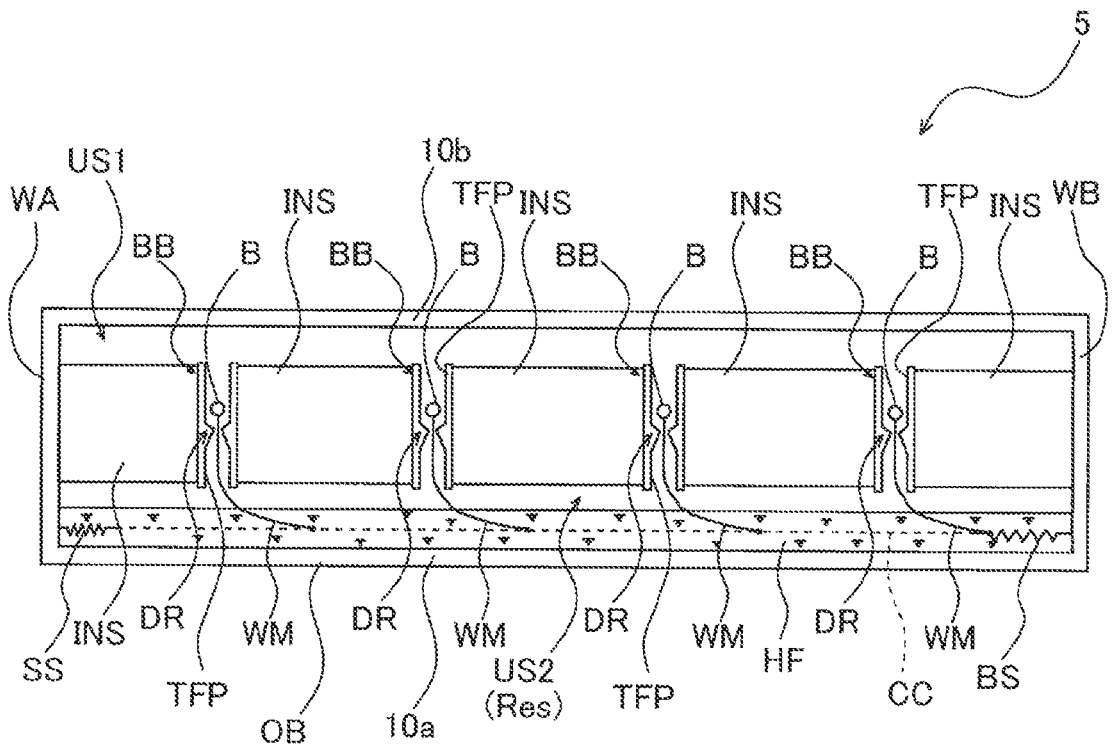
FIG. 13 is a second cross-sectional view of the roofing member according to the sixth embodiment, illustrating the cross section in the horizontal direction.

FIGS. 12 and 13 are cross-sectional views of the roofing member according to the sixth embodiment, illustrating a cross section in a horizontal direction. The roofing member 5 according to the sixth embodiment is provided on an inclined surface as in the fourth embodiment, and as illustrated in FIGS. 12 and 13, includes the outer case OB and a heat insulating member INS that is thick plate-shaped and that separates an interior of the outer case OB into an upper space US1 and a lower space US2. A plurality of through holes communicating the upper space US1 and the lower space US2 are formed in the heat insulating member INS, and a ball type valve BB is provided in each of the plurality of through holes. Each of the ball type valves BB includes a through flow path (flow path) TFP and a ball B serving as a valve body. The through flow path TFP extends along the through hole and is formed with a diameter reduced portion DR in a central portion thereof. The ball B has a diameter at a magnitude making it impossible to pass through the diameter reduced portion DR, and is provided above the diameter reduced portion DR. Therefore, the ball B is positioned to close the diameter reduced portion DR by gravity. In the sixth embodiment, a circulation structural part for the refrigerant HF is constituted by the upper space US1, the lower space US2, and the through flow path TFP, and the lower space US2 functions as the reservoir portion Res.

Further, the roofing member 5 includes, in the lower space US2, a shape memory alloy spring (temperature-sensitive means) SS, a bias spring BS, and a connecting cord CC connecting both. The shape memory alloy spring SS is a spring member having one end thereof attached to one wall WA of the outer case OB, and enters an extended state as illustrated in FIG. 12 when a temperature of the one plate 10a side (a temperature of the ceiling portion) is lower than a specific temperature. On the other hand, when the temperature of the one plate 10a side is equal to or higher than a predetermined temperature, the shape memory alloy spring SS enters a contracted state as illustrated in FIG. 13.

The bias spring BS is a spring member having one end thereof attached to the other wall WB of the outer case OB. The connecting cord CC is a cord member that connects the other end of the shape memory alloy spring SS and the other end of the bias spring BS. Since being connected to the shape memory alloy spring SS via the connecting cord CC, the bias spring BS enters a contracted state as illustrated in FIG. 12 when the temperature of the one plate 10a side is lower than the specific temperature, and enters an extended state as illustrated in FIG. 13 when the temperature of the one plate 10a side is equal to or higher than the predetermined temperature.

Further, the roofing member 5 includes a plurality of wire-shaped members WM. One end of each of the plurality of wire-shaped members WM is connected to the connecting cord CC and the other end thereof is a free end. The wire-shaped member WM is provided at the same number as the ball type valve BB. As illustrated in FIG. 13, each wire-shaped member WM thrusts up to separate the ball B away from the diameter reduced portion DR when the shape memory alloy spring SS enters the contracted state. On the other hand, as illustrated in FIG. 12, each wire-shaped member WM does not thrust up when the shape memory alloy spring SS enters the extended state, and the ball B closes the through flow path TFP and closes communication between the upper space US1 and the lower space US2.

Figure 14:
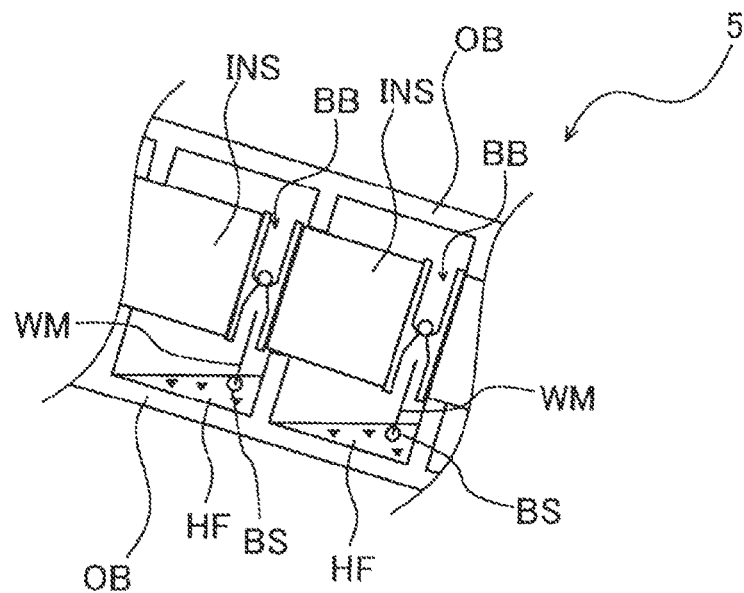
FIG. 14 is a XI-XI cross-sectional view of the configuration illustrated in FIG. 12.

FIG. 14 is a XI-XI cross-sectional view of the configuration illustrated in FIG. 12. As illustrated in FIG. 14, a plurality of outer cases OB are connected in an upper-lower direction along an inclined surface of a roof. Here, the plurality of wire-shaped members WM located at the same horizontal height are connected to each other via, the connecting cord CC as illustrated in FIGS. 12 and 13. On the other hand, as illustrated in FIG. 14, the wire-shaped members WM at different horizontal heights are not connected to each other. Since there is no such connection, a set of the shape memory alloy spring SS, the bias spring BS, and the connecting cord CC is necessary for each of the outer cases OB. The roofing member 5 may have another temperature-sensitive actuator such as a wax element, instead of the shape memory alloy spring SS.

Next, an operation of the roofing member 5 according to the sixth embodiment will be described with reference to FIGS. 12 and 13. For example, it is assumed that a room temperature at the ceiling portion, such as one in winter, is lower than the specific temperature. At this time, the shape memory alloy spring SS is in the extended state as illustrated in FIG. 12, the wire-shaped member WM does not push up the ball B, and the ball B closes the through flow path TFP and blocks the communication between the upper space US1 and the lower space US2. Accordingly, the roofing member 5 prohibits refrigerant circulation between the upper space US1 and the lower space US2 and enters a non-operating state.

On the other hand, when the room temperature at the ceiling portion is equal to or higher than the predetermined temperature, the wire-shaped member WM pushes up the ball B and the ball B leaves the through flow path TFP open, as illustrated in FIG. 13. Accordingly, the refrigerant circulation between the upper space US1 and the lower space US2 is allowed.

Further, when the room temperature is equal to or higher than the predetermined temperature and an outdoor temperature is lower than the room temperature, evaporation of a refrigerant reserved in the lower space US2 proceeds. The evaporated refrigerant reaches the upper space US1, liquefies by being cooled down, passes through the through flow path TFP, and returns to the lower space US2 again. In this process, the one plate 10a is cooled by evaporation heat due to evaporation of the refrigerant, and condensation heat of the refrigerant HF is dissipated from the other plate 10b. Accordingly, indoor heat is caused to transmit to the outside, and a cooling effect of cooling a room interior can be obtained.

In this way, according to the roofing member 5 of the sixth embodiment, as in the fourth embodiment, it is possible to cause heat of the room interior to transmit to the outside in summer, and to enter the non-operating state in winter to make it difficult for the heat to escape to the outside.

Further, according to the sixth embodiment, the refrigerant circulation can be allowed by pushing up the ball B to leave the through flow path TFP open, or be prohibited by not pushing up the ball B to close the through flow path TFP.

Figure 15:
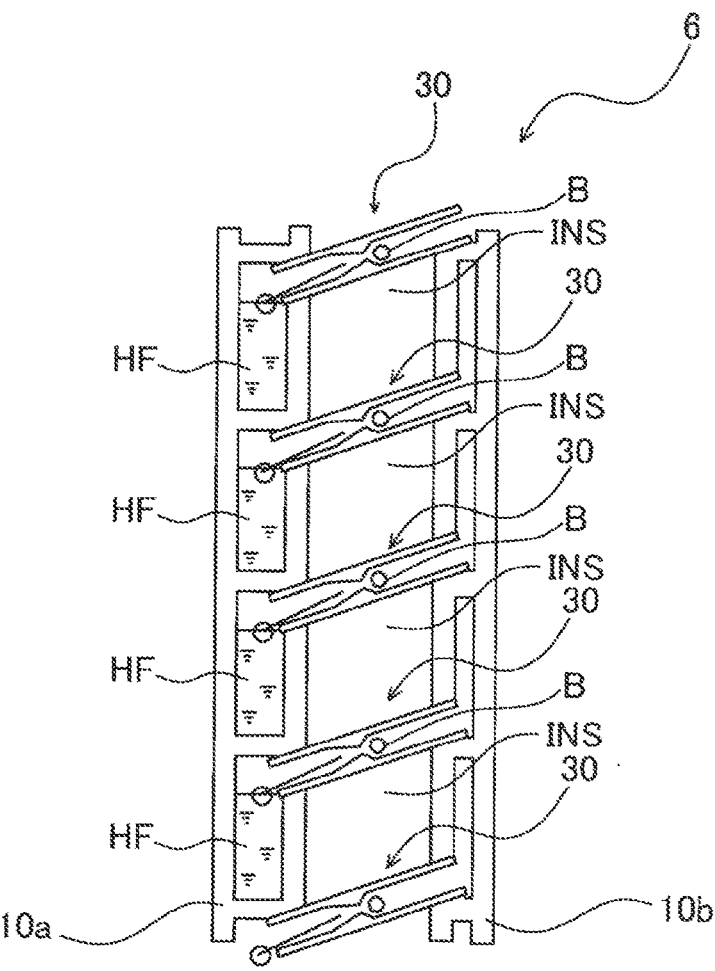
FIG. 15 is a cross-sectional view of an outer wall member according to a modification of the sixth embodiment.

The configuration using the ball B according to the sixth embodiment is not limited to a case of being used as the roofing member 5, and may be used as an outer wall member 6 as illustrated in FIG. 15. In this case, a structure close to the slope 30 illustrated in FIG. 1 is employed, and the one plate 10a side and the other plate 10b side of the slope 30 are closed or left open by the ball B.

The embodiments of the present invention have been described, but the present invention is not limited to the embodiments described above, and modifications may be made without departing from the spirit of the present invention, or techniques of the embodiments may be appropriately combined within a possible range. Further, known or well-known techniques may be combined to the present invention within a possible range.

For example, although the outer wall members 1, 2, and 6 have been described as examples in the above embodiments, the two plates 10, the refrigerant HF, the slope 30, and the like may be formed of a transparent member when applied to the window. Further, although an example in which the two plates 10 are arranged substantially parallel to each other is described in the above embodiments, the two plates 10 may not be arranged in parallel.

In the embodiments described above, the slope 30 is employed as an example of a configuration for performing the refrigerant circulation. However, if the structural body has a structure in which the refrigerant HF from the reservoir portion Res which has evaporated reaches the other plate 10b side, condenses on the other plate 10b side and is returned to the reservoir portion Res again, the slope 30 may not be employed. For example, in a case where the structure is used for an inclined surface relatively close to a horizontal plane as in the sixth embodiment, or in a case where the structure is used for a complete horizontal surface, the slope 30 may not be employed when the refrigerant HF is the latent heat storage material PCM. For example, if the latent heat storage material PCM is accommodated in the outer case OB, verruca form projections are provided on an inner side of an upper surface of the outer case OB, and the refrigerant HF is dropped from the projections, a circulation structure can be implemented without the slope 30. In addition, a rib may be provided instead of the verruca form projections.

The present application is based on Japanese Patent Application No. 2018-117530 filed on Jun. 21, 2018, the contents of which are incorporated herein by reference.

The invention claimed is:

1. A structural body comprising:
   a first plate and a second plate;
   a refrigerant that is enclosed between the first plate and the second plate;
   a circulation structural part provided in a space between the first plate and the second plate and comprising a first cavity including a reservoir for the refrigerant provided on a first plate side and a second cavity provided on a second plate side, the circulation structural part in which the refrigerant from the reservoir which has evaporated due to heat of the first plate side reaches the second cavity, condenses on the second cavity and is returned to the reservoir again; and
   a temperature sensitive mechanism that is in a first state when a temperature of the first plate side is equal to or higher than a predetermined temperature to allow refrigerant circulation in which the refrigerant in the reservoir after evaporating condenses and returns to the reservoir again, and is in a second state different from the first state when the temperature of the first plate side is lower than a specific temperature that is equal to or lower than the predetermined temperature to prohibit the refrigerant circulation.

2. The structural body according to claim 1,
wherein the temperature-sensitive mechanism comprises a water stop cord that is in a dry state by exhibiting hydrophobicity when the temperature of the first plate side is equal to or higher than the predetermined temperature to be in the first state in which the water stop cord opens a flow path connecting the reservoir and the second cavity, and that is in a swelling state by exhibiting water absorbability when the temperature of the first plate side is lower than the specific temperature to be in the second state in which the water stop cord closes the flow path connecting the reservoir and the second cavity.

3. The structural body according to claim 1,
wherein the temperature-sensitive mechanism comprises a temperature-sensitive water absorption polymer that exhibits hydrophobicity when the temperature of the first plate side is equal to or higher than the predetermined temperature to be in the first state in which the temperature-sensitive water absorption polymer releases water serving as the refrigerant, and that exhibits water absorbability when the temperature of the first plate side is lower than the specific temperature to be in the second state in which the temperature-sensitive water absorption polymer absorbs the water serving as the refrigerant.

4. The structural body according to claim 1,
wherein the temperature-sensitive mechanism comprises:
   a latent heat storage material serving as the refrigerant, the latent heat storage material being in the first state in which the latent heat storage material is dissolved when the temperature of the first plate side is equal to or higher than the predetermined temperature, and in the second state in which the latent heat storage material is solidified when the temperature of the first plate side is lower than the specific temperature; and
   a valve body that is in the first state in which the valve body opens a flow path connecting the reservoir and the second cavity when the temperature of the first plate side is equal to or higher than the predetermined temperature, and is in the second state in which the valve body closes the flow path when the temperature of the first plate side is lower than the specific temperature,
wherein the valve body comprises a hollow tube having an internal pressure lower than atmospheric pressure, and
wherein when the temperature of the first plate side is equal to or higher than the predetermined temperature, the hollow tube contracts due to rising of a refrigerant vapor pressure to be in the first state in which the flow path is opened, and when the temperature of the first plate side is lower than the specific temperature, the hollow tube expands due to decreasing of the refrigerant vapor pressure to be in the second state in which the flow path is closed.

5. The structural body according to claim 1, further comprising:
a ball that is provided on an upper side with respect to a diameter reduced portion of a flow path connecting the reservoir and the second cavity,
wherein when the temperature of the first plate side is equal to or higher than the predetermined temperature, a wire-shaped member push up the ball from below the diameter reduced portion such that the ball is separated away from the diameter reduced portion to allow the temperature-sensitive mechanism to be in the first state in which the flow path is opened; and when the temperature of the first plate side is lower than the specific temperature, the wire-like member does not push up the ball such that the ball closes the diameter reduced portion to allow the temperature-sensitive mechanism to be in the second state in which the flow path is closed.

6. The structural body according to claim 1,
wherein the structural body is configured to transfer heat from an indoor room of a building to an outdoor space that is external to the building, and
wherein the first plate extends along the indoor room and the second plate extends along the outdoor space.

7. The structural body according to claim 1,
wherein the temperature sensitive mechanism is provided above the first cavity and below the second cavity.

8. The structural body according to claim 1,
wherein the temperature-sensitive mechanism comprises a valve body that is in the first state in which the valve body opens a flow path connecting the reservoir and the second cavity when the temperature of the first plate side is equal to or higher than the predetermined temperature, and that is in the second state in which the valve body closes the flow path when the temperature of the first plate side is lower than the specific temperature.

9. The structural body according to claim 8,
wherein the valve body comprises a hollow tube having an internal pressure lower than atmospheric pressure, and
wherein when the temperature of the first plate side is equal to or higher than the predetermined temperature, the hollow tube contracts due to rising of a refrigerant vapor pressure and is in the first state in which the flow path is opened, and when the temperature of the first plate side is lower than the specific temperature, the hollow tube expands due to decreasing of the refrigerant vapor pressure and is in the second state in which the flow path is closed.

10. The structural body according to claim 8,
wherein the valve body comprises a membranous member and a spring configured to operate the membranous member, and
wherein the valve body is in the first state in which the flow path is opened in a case where the spring is in a contracted state when the temperature of the first plate side is equal to or higher than the predetermined temperature to cause the membranous member to be retracted toward an attached side, and in the second state in which the flow path is closed in a case where the spring is in an extended state when the temperature of the first plate side is lower than the specific temperature to cause the membranous member protrude toward a side opposite from the attached side.

11. The structural body according to claim 8,
wherein the valve body comprises: a membranous body that is in a state in which the membranous body is retracted toward an attached side when the temperature of the first plate side is equal to or higher than the predetermined temperature to be in the first state in which the flow path is opened, and is in a state in which the membranous body protrudes toward a side opposite from the attached side when the temperature of the first plate side is lower than the specific temperature to be in the second state in which the flow path is closed.

12. The structural body according to claim 8, further comprising:
a plate member that is provided in the flow path to block communication between the reservoir and the second cavity and that is formed with a through hole,
wherein the valve body comprises a bimetal that is in the first state in which the bimetal opens the through hole when the temperature of the first plate side is equal to or higher than the predetermined temperature, and that is in the second state in which the bimetal closes the through hole when the temperature of the first plate side is lower than the specific temperature.

13. The structural body according to claim 1,
wherein the temperature-sensitive mechanism enters the second state to prohibit the refrigerant circulation in a case where the refrigerant solidifies when the temperature of the first plate side is lower than the specific temperature.

14. The structural body according to claim 13,
wherein the temperature-sensitive mechanism comprises a gelling agent that is in the first state in which the gelling agent is dissolved when the temperature of the first plate side is equal to or higher than the predetermined temperature, and that is in the second state of in which the gelling agent is gelled when the temperature of the first plate side is lower than the specific temperature, and
wherein when the gelling agent is in the first state, the refrigerant that is a part of the gelling agent is allowed for the refrigerant circulation, and when the gelling agent is in the second state, the refrigerant that is a part of the gelling agent is not allowed for the refrigerant circulation.

15. The structural body according to claim 13,
wherein the temperature-sensitive mechanism comprises a latent heat storage material that is in the first state in which the latent heat storage material is dissolved when the temperature of the first plate side is equal to or higher than the predetermined temperature, and that is in the second state in which the latent storage material is solidified when the temperature of the first plate side is lower than the specific temperature, and
wherein when the latent heat storage material is in the first state, the refrigerant that is a part of the latent heat storage material is allowed for the refrigerant circulation, and when the latent heat storage material is in the second state, the refrigerant that is a part of the latent heat storage material is not allowed for the refrigerant circulation.

16. The structural body according to claim 15,
wherein the latent heat storage material comprises an inorganic salt hydrate, and when the latent heat storage material is dissolved, hydrated water thereof functions as the refrigerant.

* * * * *